United States Patent
Lee et al.

(10) Patent No.: US 11,591,487 B2
(45) Date of Patent: *Feb. 28, 2023

(54) CURABLE RESIN COMPOSITION COMPRISING A PHTHALONITRILE OLIGOMER AND A PREPOLYMER THEREOF

(71) Applicant: LG CHEM, LTD., Seoul (KR)

(72) Inventors: Seunghee Lee, Daejeon (KR); Youngdae Kim, Daejeon (KR); Eun Ho Kho, Daejeon (KR); Sang Woo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/964,529

(22) PCT Filed: Sep. 20, 2019

(86) PCT No.: PCT/KR2019/012201
§ 371 (c)(1),
(2) Date: Jul. 23, 2020

(87) PCT Pub. No.: WO2020/060262
PCT Pub. Date: Mar. 26, 2020

(65) Prior Publication Data
US 2021/0206908 A1    Jul. 8, 2021

(30) Foreign Application Priority Data
Sep. 21, 2018 (KR) .................. 10-2018-0114412
Sep. 21, 2018 (KR) .................. 10-2018-0114413

(51) Int. Cl.
*C09D 11/102* (2014.01)
*C08G 61/02* (2006.01)
(Continued)

(52) U.S. Cl.
CPC ............ *C09D 11/102* (2013.01); *C08G 61/02* (2013.01); *C08K 5/0025* (2013.01);
(Continued)

(58) Field of Classification Search
CPC ........ C08G 65/40; C08G 67/00; C08G 73/00; C08G 33/00; C08G 61/02;
(Continued)

(56) References Cited

U.S. PATENT DOCUMENTS 4,244,857 A    1/1981   Serafini et al.
4,408,035 A    10/1983  Keller
(Continued)

FOREIGN PATENT DOCUMENTS

CN    104086727 A    10/2014
CN    105566629 A    5/2016
(Continued)

*Primary Examiner* — Shane Fang
(74) *Attorney, Agent, or Firm* — Dentons US LLP

(57) ABSTRACT

A curable resin composition includes a phthalonitrile oligomer, and a prepolymer thereof. According to the present invention, a curable resin composition, which has melt viscosity that can be controlled within a wide range, and thus, can be applied in a larger number of fields.

12 Claims, 8 Drawing Sheets

(51) Int. Cl.
*C08K 5/00* (2006.01)
*C08K 5/3417* (2006.01)
*C08L 65/00* (2006.01)

(52) U.S. Cl.
CPC ............ *C08K 5/3417* (2013.01); *C08L 65/00* (2013.01); *C08G 2261/143* (2013.01); *C08G 2261/1424* (2013.01); *C08G 2261/312* (2013.01); *C08G 2261/63* (2013.01)

(58) Field of Classification Search
CPC ...... C08G 2261/1424; C08G 2261/312; C08G 2261/63; C09D 11/102; C08K 5/0025; C08K 5/3417; C08L 65/00
See application file for complete search history.

(56) References Cited

U.S. PATENT DOCUMENTS

| | | |
|---|---|---|
| 5,003,039 A | 3/1991 | Keller |
| 5,003,078 A | 3/1991 | Keller |
| 5,004,801 A | 4/1991 | Keller et al. |
| 5,132,396 A | 6/1992 | Keller |
| 5,139,054 A | 8/1992 | Long et al. |
| 5,208,318 A | 5/1993 | Keller |
| 5,237,045 A | 8/1993 | Burchill et al. |
| 5,292,854 A | 3/1994 | Keller |
| 5,350,828 A | 9/1994 | Keller et al. |
| 6,756,470 B2 | 6/2004 | Keller et al. |
| 7,144,146 B2 | 12/2006 | Takeuchi et al. |
| 7,452,959 B2 | 11/2008 | Keller et al. |
| 7,511,113 B2 | 3/2009 | Keller et al. |
| 9,708,440 B2 | 6/2017 | Das et al. |
| 9,873,761 B1 | 1/2018 | Das et al. |
| 2016/0168327 A1 | 6/2016 | Keller et al. |
| 2016/0369040 A1 | 12/2016 | Das et al. |
| 2018/0346646 A1* | 12/2018 | Kim ................... C08G 73/1007 |
| 2018/0355180 A1 | 12/2018 | Ahn et al. |
| 2019/0127525 A1 | 5/2019 | Lee et al. |
| 2019/0169364 A1 | 6/2019 | Kim et al. |
| 2019/0276605 A1 | 9/2019 | Ahn et al. |

FOREIGN PATENT DOCUMENTS

| | | |
|---|---|---|
| CN | 107266336 A | 10/2017 |
| KR | 10-2005-0006190 A | 1/2005 |
| KR | 10-2008-0098435 A | 11/2008 |
| KR | 10-2017-0064870 A | 6/2017 |
| KR | 10-2017-0065954 A | 6/2017 |
| KR | 10-2018-0050213 A | 5/2018 |
| KR | 10-2018-0060487 A | 6/2018 |
| WO | 2007102766 A1 | 9/2007 |
| WO | 2017119793 A1 | 7/2017 |
| WO | 2017172515 A1 | 10/2017 |
| WO | 2018030552 A1 | 2/2018 |

\* cited by examiner

[FIG. 1]
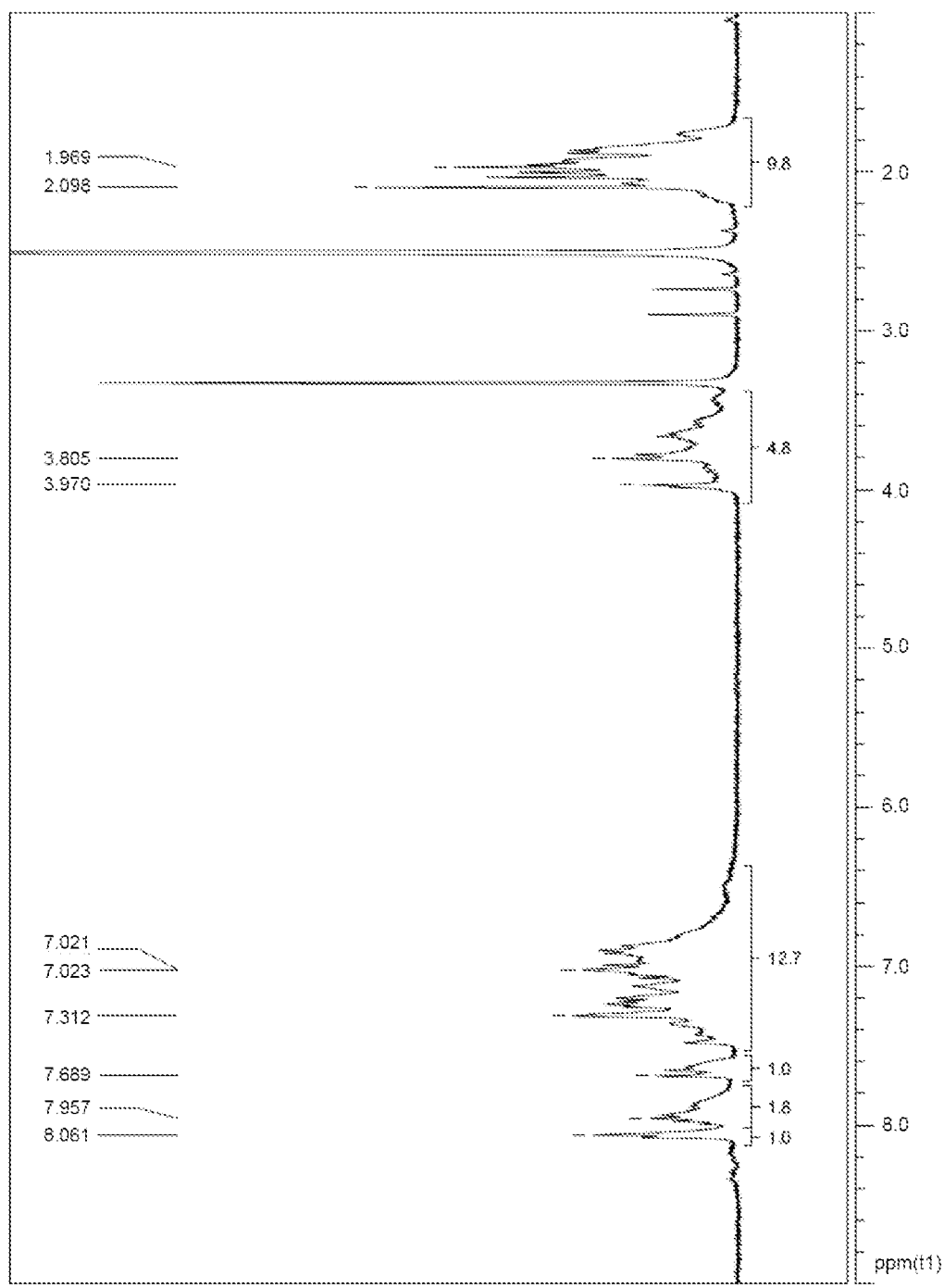

[FIG. 2]
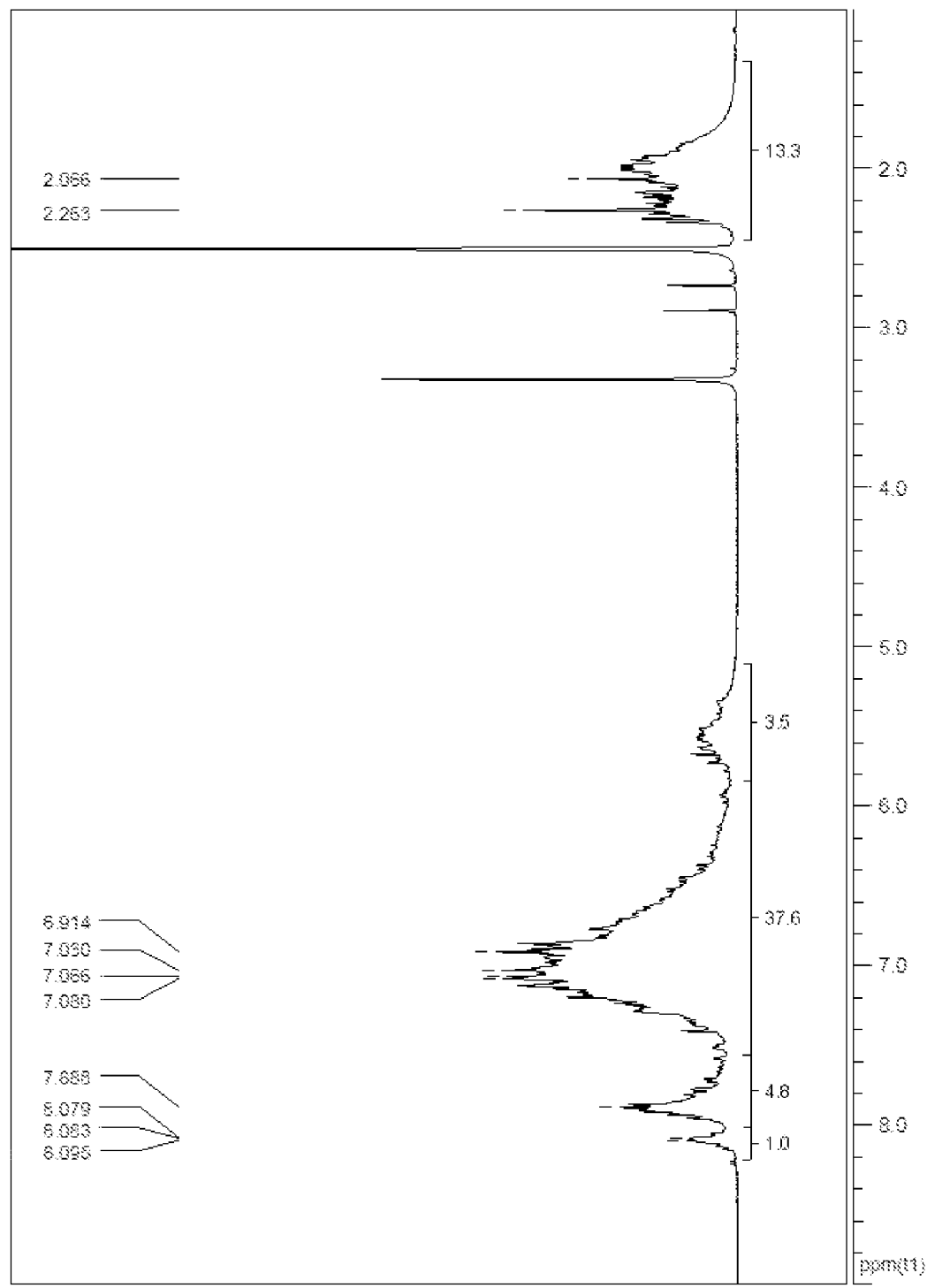

[FIG. 3]
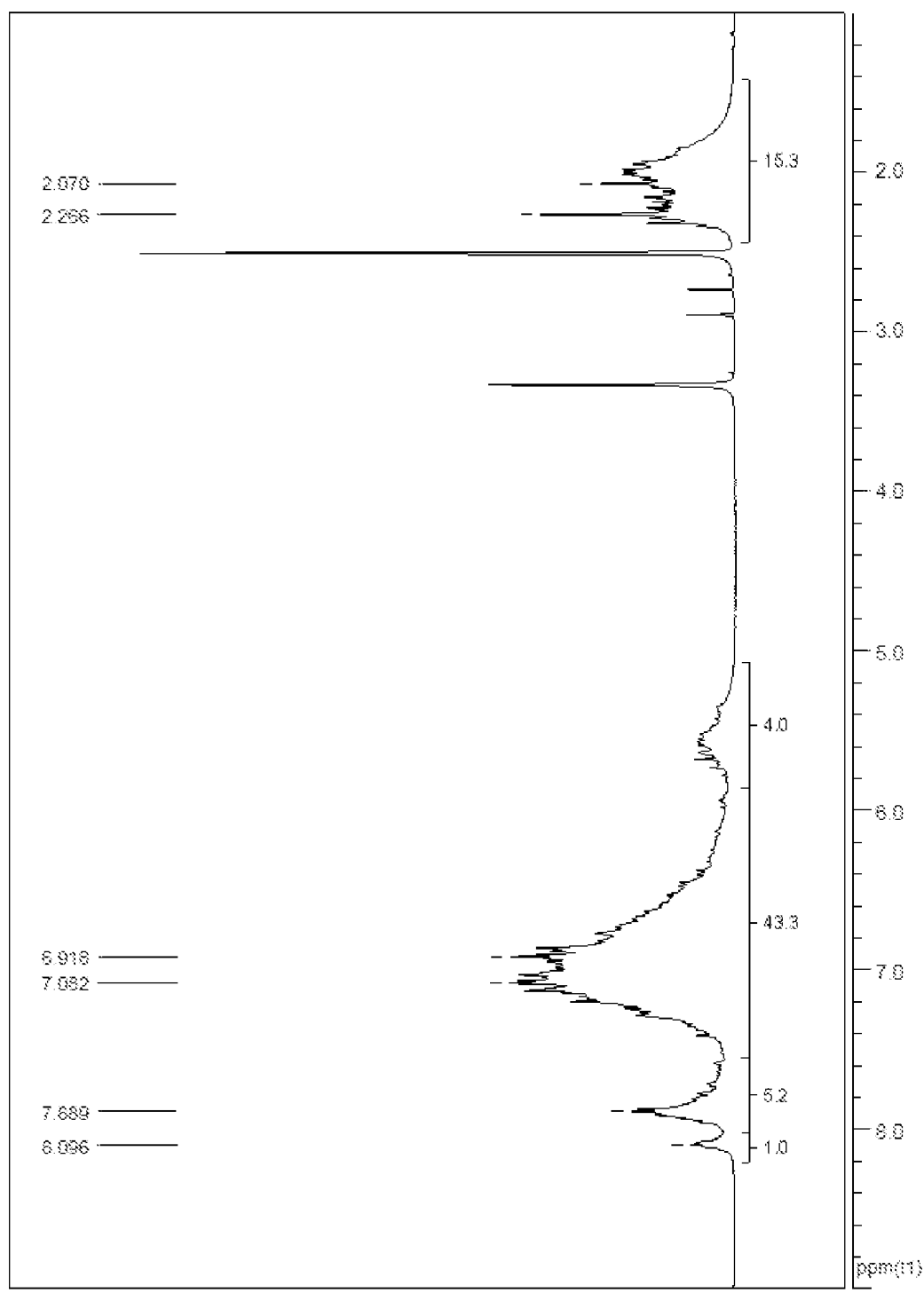

【FIG. 4】
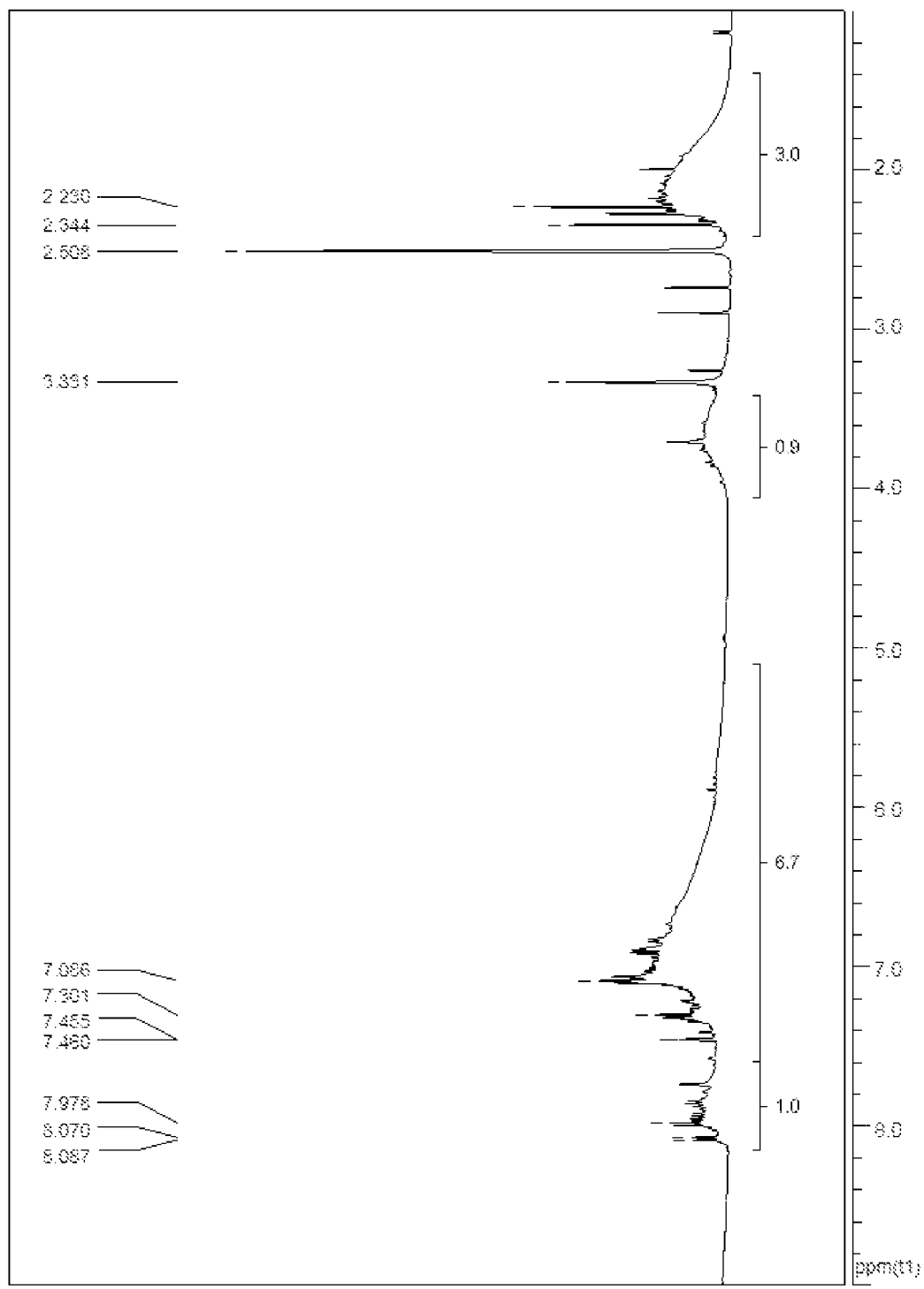

[FIG. 5]
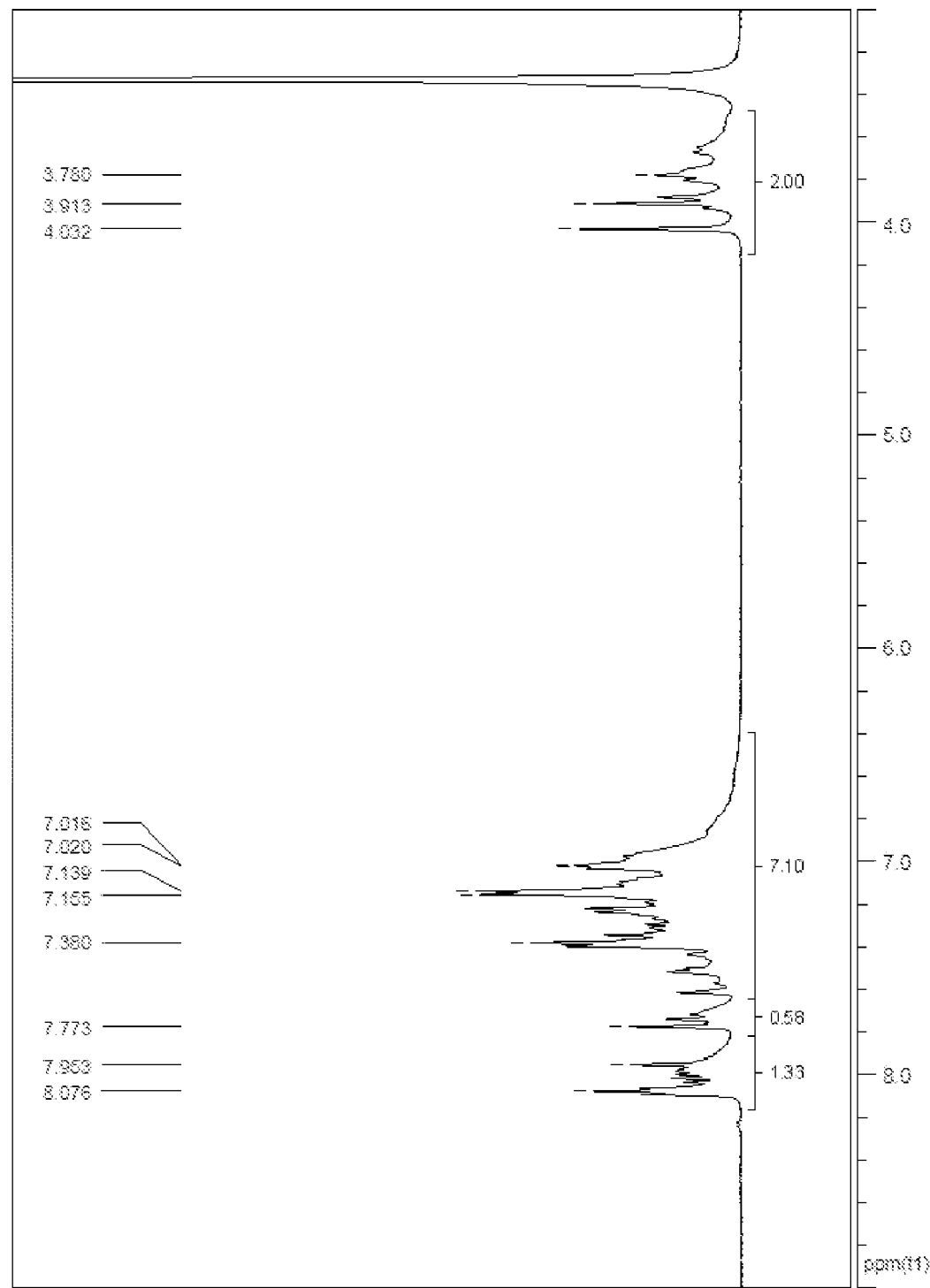

[FIG. 6]
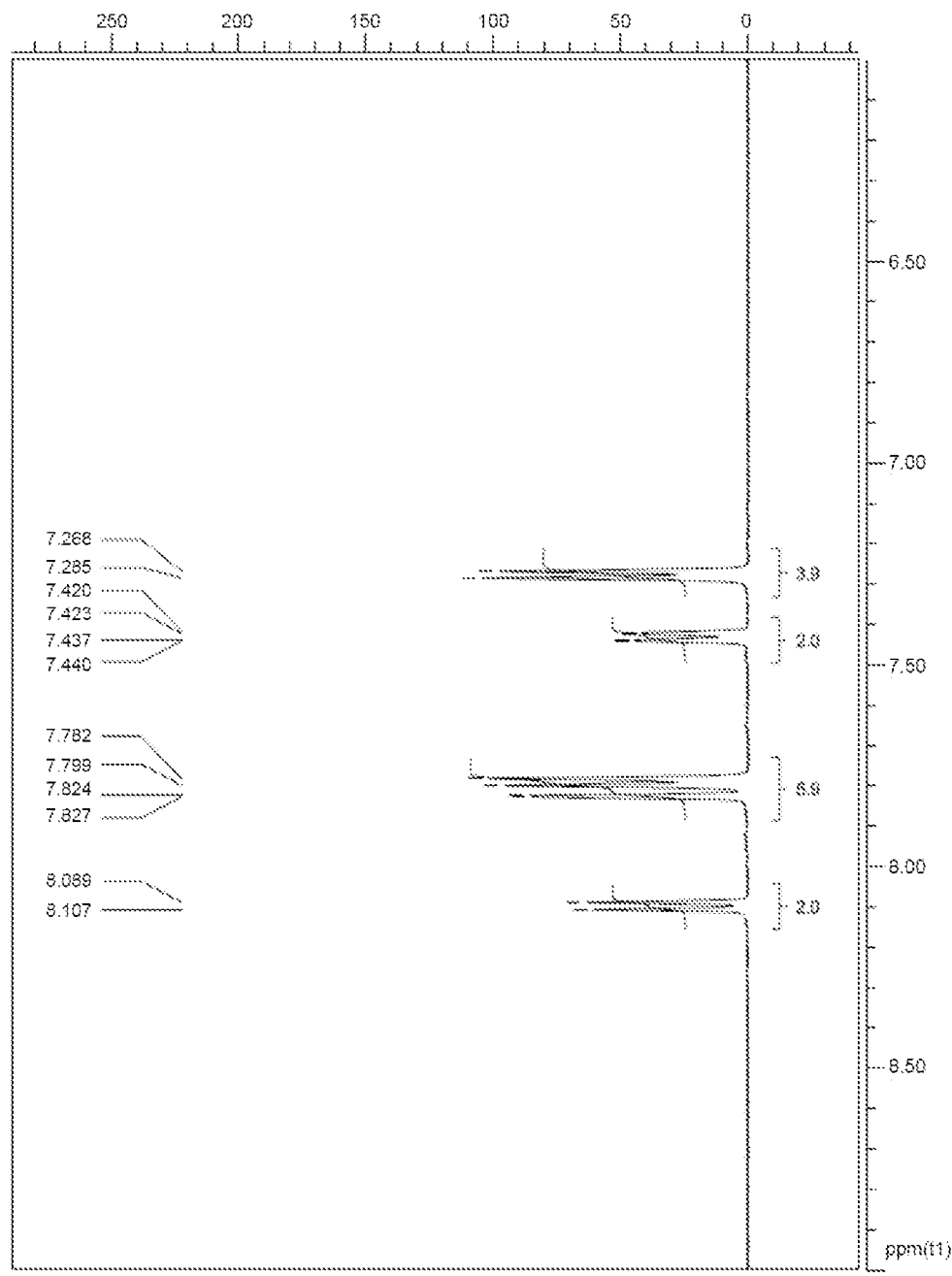

[FIG. 7]
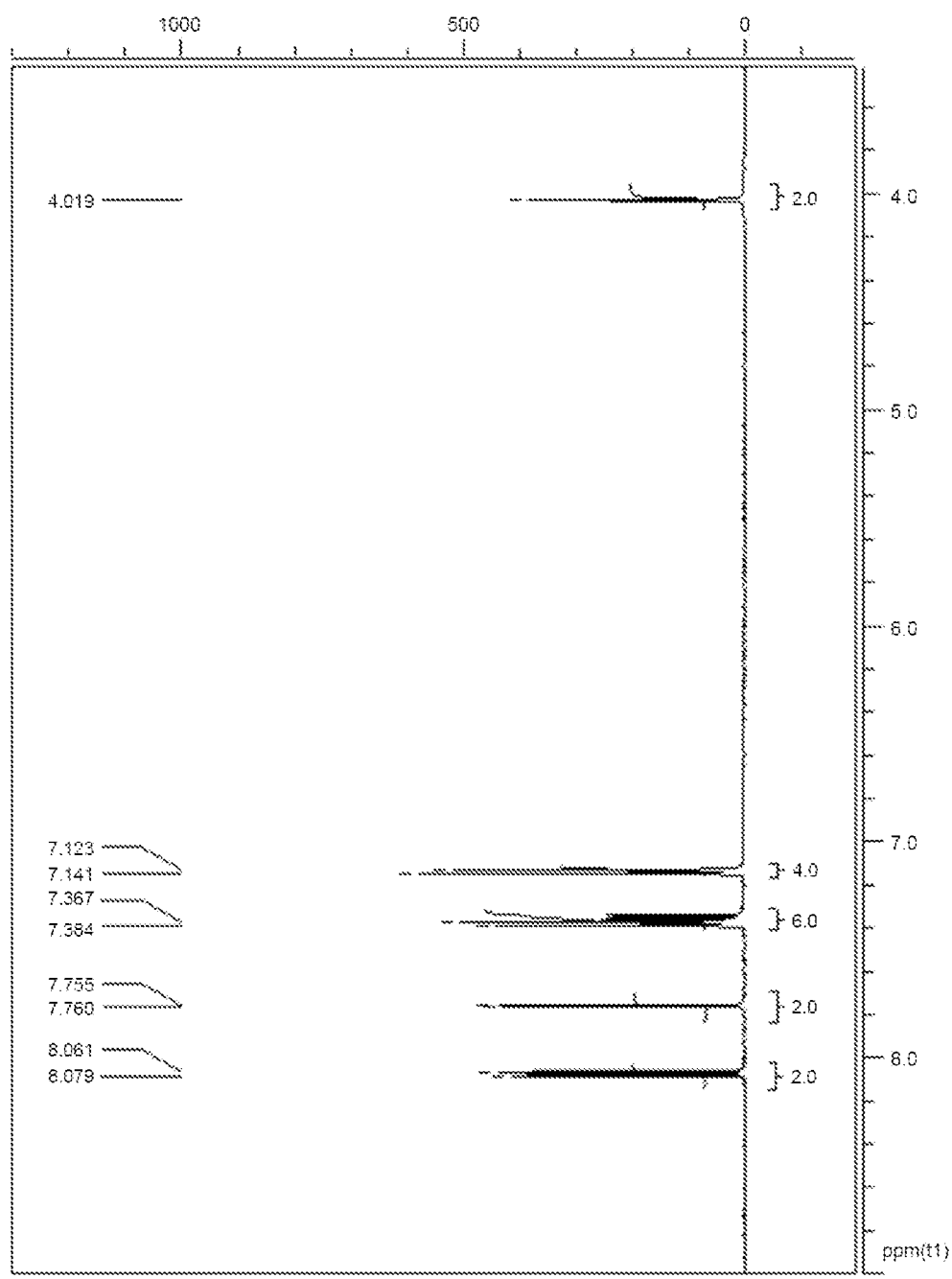

[FIG. 8]
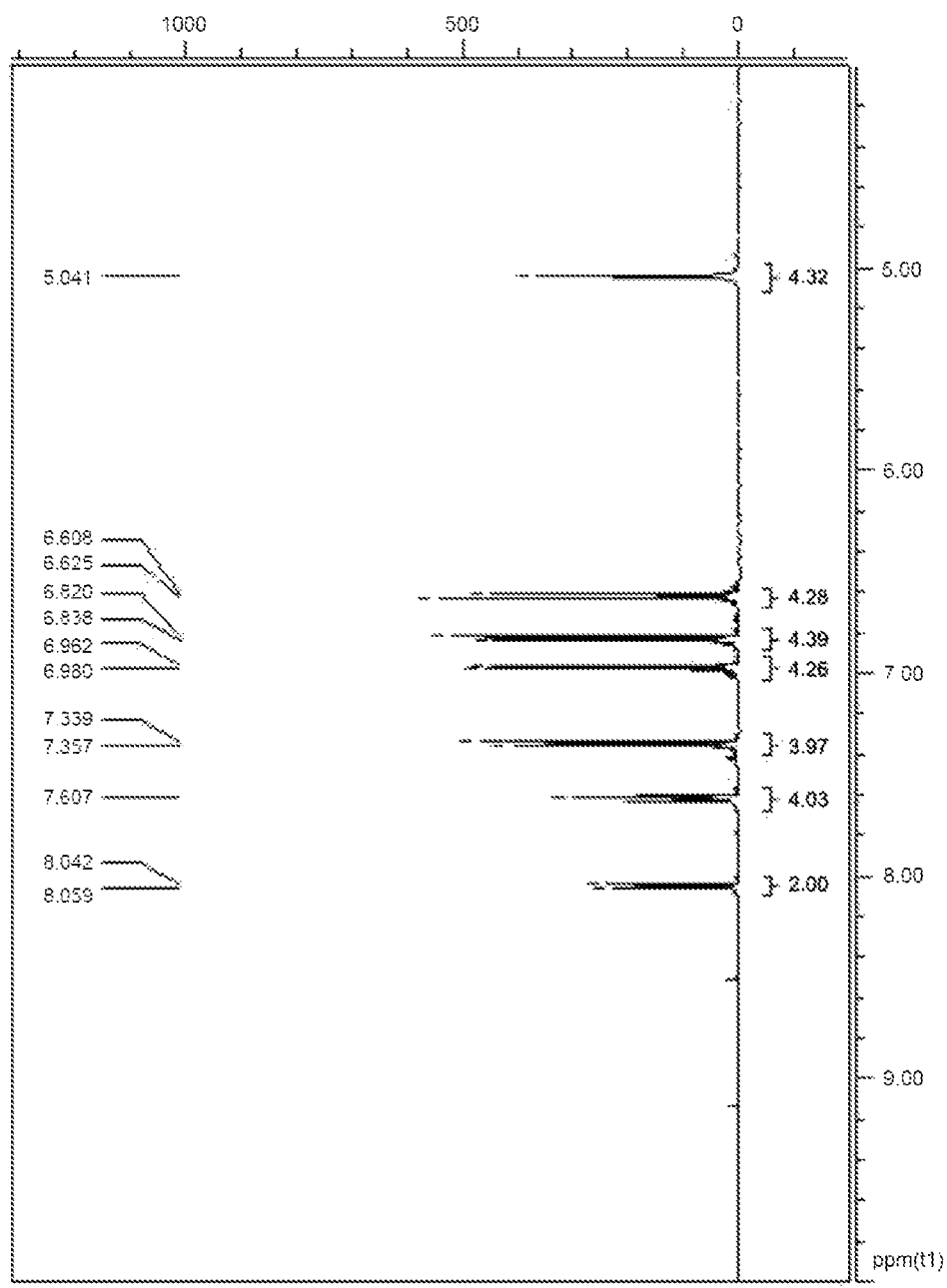

CURABLE RESIN COMPOSITION COMPRISING A PHTHALONITRILE OLIGOMER AND A PREPOLYMER THEREOF

The present application is a National Phase entry pursuant to 35 U.S.C. § 371 of International Application no. PCT/KR2019/012201 filed on Sep. 20, 2019, and claims priority to and the benefit of Korean Patent Application No. 10-2018-0114412 and Korean Patent Application No. 10-2018-0114413 both filed on Sep. 21, 2018 with the Korean Intellectual Property Office, the disclosures of which are herein incorporated by reference in their entirety.

FIELD

The present invention relates to a phthalonitrile oligomer and a prepolymer thereof.

BACKGROUND

Phthalonitrile-based resin is known as thermosetting resin having excellent heat resistance and flame retardancy. A resin composition comprising phthalonitrile-based resin and additives such as glass fiber, carbon fiber, and the like can be used as durable goods in airplanes, ships, automobiles, and the like.

The phthalonitrile-based resin is generally formed by polymerization and high temperature curing of a phthalonitrile compound having two or more phthalonitrile groups and a curing agent therefor.

In general, the phthalonitrile compound has many aromatic groups, and thus, has high rigidity and large molecular weight. Thus, a mixture of the phthalonitrile compound and a curing agent or a prepolymer formed by the reaction of the mixture has a very narrow process window.

Meanwhile, since phthalonitrile-based resin has very low viscosity at a temperature equal to or greater than a melting point, a problem of leakage from a mold is generated during processing with a mold such as injection and extrusion. To the contrary, low melt viscosity of phthalonitrile-based resin is advantageous for securing compatibility with fillers when preparing composite material using a large quantity of fillers.

Thus, in order to apply phthalonitrile-based resin for more various fields, it is required to simultaneously secure wetting of a filler and an appropriate melt viscosity of the phthalonitrile-based resin.

SUMMARY

It is an object of the present invention to provide a curable resin composition that has melt viscosity controllable within a wide range, and thus, can be applied to more fields.

It is another object of the present invention to provide a prepolymer, which is a reaction product of the curable resin composition.

According to the present invention, a curable resin composition is provided, which comprises (a) a phthalonitrile oligomer comprising one or more repeat units represented by the following Chemical Formula 1 and (b) a curing agent.

[Chemical Formula 1]

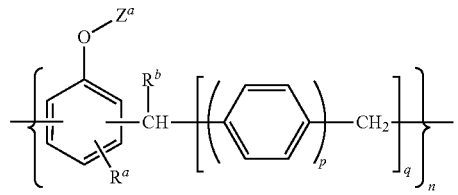

in the Chemical Formula 1,
$R^a$ and $R^b$ are each independently hydrogen, a $C_{1-5}$ alkyl group, a $C_{1-3}$ hydroxyalkyl group, or a group represented by

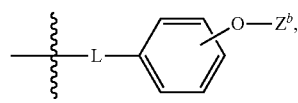

L is a direct bond or a $C_{1-5}$ alkylene group unsubstituted or substituted with a $C_{1-5}$ alkyl group,
$Z^a$ and $Z^b$ are each independently, hydrogen or a group of

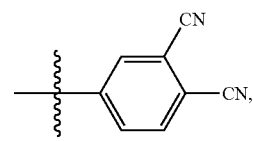

and at least one of $Z^a$ and $Z^b$ included the Chemical Formula 1 is a group of

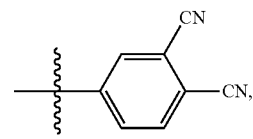

p is 1 to 10,
q is 0 or 1, and
n is a degree of polymerization of the repeat units represented by the Chemical Formula 1.

And, according to the present invention, a prepolymer, which is a reaction product of the curable resin composition, is provided.

BRIEF DESCRIPTION OF THE DRAWINGS

FIG. 1 shows the $^1$H-NMR spectrum of the compound prepared in Preparation Example 1.
FIG. 2 shows the $^1$H-NMR spectrum of the compound prepared in Preparation Example 2.
FIG. 3 shows the $^1$H-NMR spectrum of the compound prepared in Preparation Example 3.
FIG. 4 shows the $^1$H-NMR spectrum of the compound prepared in Preparation Example 4.
FIG. 5 shows the $^1$H-NMR spectrum of the compound prepared in Preparation Example 6.
FIG. 6 shows the $^1$H-NMR spectrum of the compound prepared in Preparation Example 7.
FIG. 7 shows the $^1$H-NMR spectrum of the compound prepared in Preparation Example 8.

FIG. 8 shows the $^1$H-NMR spectrum of the compound prepared in Preparation Example 9.

DETAILED DESCRIPTION

Hereinafter, a curable resin composition and a prepolymer thereof according to the embodiments of the invention will be explained in detail.

First, the technical the terms used herein are only to explain specific embodiments, and are not intended to limit the present invention.

A singular expression includes a plural expression thereof, unless it is expressly stated or obvious from the context that such is not intended.

As used herein, the term "comprise" is intended to designate the existence of practiced characteristic, number, step, constructional element or combinations thereof, and it is not intended to preclude the possibility of existence or addition of one or more other characteristics, numbers, steps, constructional elements or combinations thereof.

As used herein, the mark ⸺ในาาา in the Chemical Formulas means a position where a corresponding group is connected to another group.

I. A Curable Resin Composition

According to one embodiment of the invention, a curable resin composition is provided, which comprises (a) a phthalonitrile oligomer comprising one or more repeat units represented by the following Chemical Formula 1 and (b) a curing agent.

[Chemical Formula 1]

in the Chemical Formula 1, $R^a$ and $R^b$ are each independently hydrogen, a $C_{1-5}$ alkyl group, a $C_{1-3}$ hydroxyalkyl group, or a group represented by

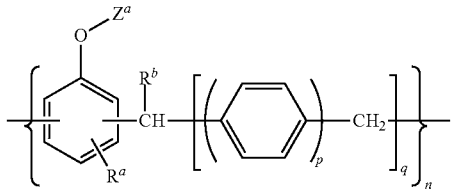

L is a direct bond or a $C_{1-5}$ alkylene group unsubstituted or substituted with a $C_{1-5}$ alkyl group, $Z^a$ and $Z^b$ are each independently, hydrogen or a group of

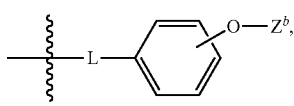

and at least one of $Z^a$ and $Z^b$ included in the repeat unit represented by the Chemical Formula 1 is a group of

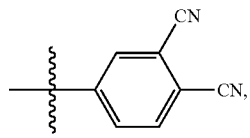

p is 1 to 10, q is 0 or 1, and n is a degree of polymerization of the repeat units represented by the Chemical Formula 1.

As the result of continuous studies, the present inventors confirmed that a phthalonitrile oligomer comprising one or more repeat units represented by the Chemical Formula 1 has low softening point, and thus, can realize excellent processability.

The phthalonitrile oligomer has large molecular weight compared to common phthalonitrile monomers, and thus, can maintain melt viscosity above a certain level even under melting conditions. Particularly, the phthalonitrile oligomer may have a melt viscosity that can be controlled within a wide range through the control of the molecular weight.

A curable resin composition comprising the phthalonitrile oligomer may simultaneously have excellent wettability to a filler and appropriate melt viscosity. And thus, the curable resin composition exhibits excellent processability during the preparation of composite materials and a forming process using a mold, and thus, enables the application of phthalonitrile-based compounds to a larger number of fields.

Hereinafter, components that can be included in the curable resin composition will be explained.

(a) A Phthalonitrile Oligomer

According to the embodiment of the invention, in the curable resin composition, a phthalonitrile oligomer comprising one or more repeat units represented by the following Chemical Formula 1 is included

[Chemical Formula 1]

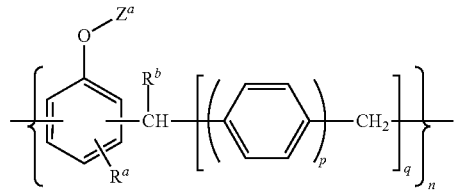

in the Chemical Formula 1, $R^a$ and $R^b$ are each independently hydrogen, a $C_{1-5}$ alkyl group, a $C_{1-3}$ hydroxyalkyl group, or a group represented by

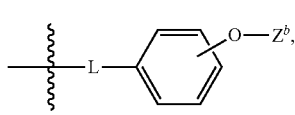

L is a direct bond or a $C_{1-5}$ alkylene group unsubstituted or substituted with a $C_{1-5}$ alkyl group, $Z^a$ and $Z^b$ are each independently, hydrogen or a group of

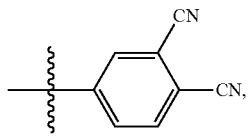 [SMILES: *c1ccc(C#N)c(C#N)c1]

and at least one of $Z^a$ and $Z^b$ included the Chemical Formula 1 is a group of

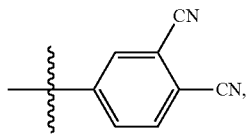

p is 1 to 10,
q is 0 or 1, and
n is a degree of polymerization of the repeat unit represented by the Chemical Formula 1.

As used herein, the term "substituted or unsubstituted" includes mono-substituted or multi-substituted with one or more substituent groups or unsubstituted.

As used herein, an "alkyl group" may be a linear chain or a branched chain. Preferably, the alkyl group has a carbon number of 1 to 5, or 1 to 3. Specifically, the alkyl group may be methyl, ethyl, propyl, n-propyl, isopropyl, butyl, n-butyl, isobutyl, tert-butyl, sec-butyl, 1-methyl-butyl, 1-ethyl-butyl, n-pentyl, isopentyl, neopentyl, and ter-pentyl, and the like.

As used herein, a "hydroxyalkyl group" means a group wherein an alkylene group is substituted with a hydroxy group at the end. For example, the hydroxyalkyl group may be a hydroxymethyl group (—CH$_2$OH), a hydroxyethyl group (—CH$_2$CH$_2$OH), a hydroxypropyl group (—CH$_2$CH$_2$CH$_2$OH), and the like.

As used herein, an "aryl group" may be a monocyclic aryl group or a polycyclic aryl group. Preferably, the aryl group has a carbon number of 6 to 30. Specifically, the aryl group may be a phenyl group, a biphenyl group, a terphenyl group, a naphthyl group, an anthracenyl group, a phenanthryl group, a pyrenyl group, a perylenyl group, a chrysenyl group, and a fluorenyl group, and the like.

As used herein, a "direct bond" means that an atom does not exist at the corresponding position, and the groups of both sides are directly connected with each other.

The (a) phthalonitrile oligomer comprises one or more repeat units represented by the Chemical Formula 1.

Preferably, the (a) phthalonitrile oligomer may comprise one, or two or three repeat units represented by the Chemical Formula 1.

In case the (a) phthalonitrile oligomer comprises two or more repeat units represented by the Chemical Formula 1, the structure of each repeat unit may be different from each other.

In the Chemical Formula 1, $R^a$ and $R^b$ are each independently hydrogen, a $C_{1-5}$ alkyl group, a $C_{1-3}$ hydroxyalkyl group, or a group represented by

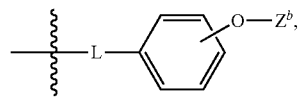

wherein L is a direct bond or a $C_{1-5}$ alkylene group unsubstituted or substituted with a $C_{1-5}$ alkyl group.

In the Chemical Formula 1, $Z^a$ and $Z^b$ are each independently, hydrogen or a group of

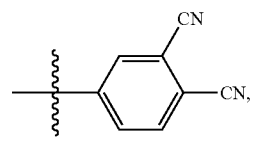 [SMILES: *c1ccc(C#N)c(C#N)c1]

provided that at least one of $Z^a$ and $Z^b$ included the repeat unit represented by the Chemical Formula 1 is a group of

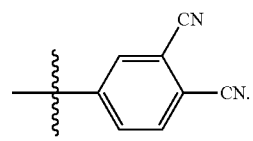

In the Chemical Formula 1, p is 1 to 10, or 1 to 5, or 1 to 2.

In the Chemical Formula 1, q is 0 or 1.

And, in the Chemical Formula 1, n is a degree of polymerization of the repeat unit.

According to the embodiment of the invention, the phthalonitrile oligomer may be represented by one of the following Chemical Formulas A to D.

[Chemical Formula A]

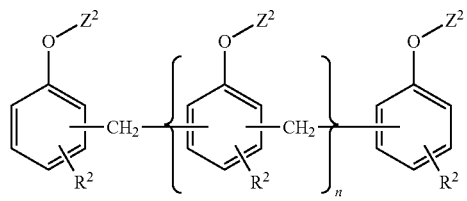

[Chemical Formula B]

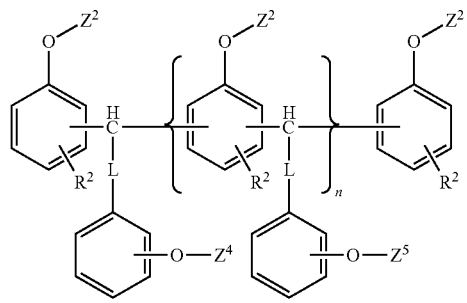

-continued

[Chemical Formula C]

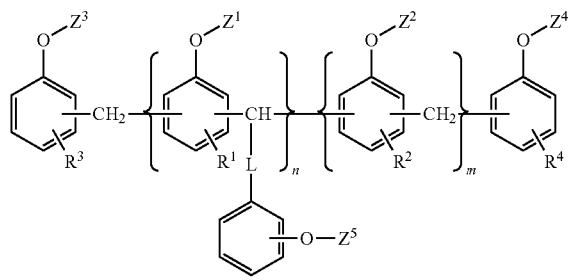

[Chemical Formula D]

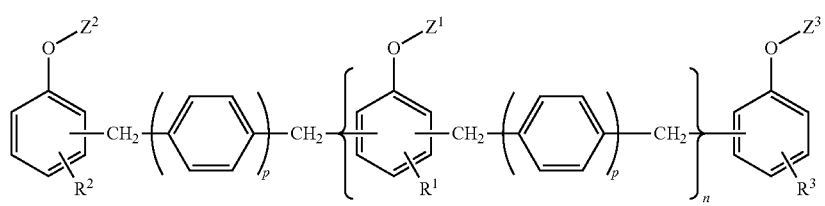

in the Chemical Formulas A to D,
$R^1$ to $R^4$ are each independently, hydrogen, a $C_{1-5}$ alkyl group, a $C_{1-3}$ hydroxyalkyl group, or a group represented by

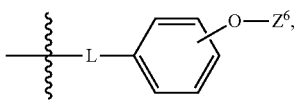

and L is a direct bond or a $C_{1-5}$ alkylene group unsubstituted or substituted with a $C_{1-5}$ alkyl group,
$Z^1$ to $Z^5$ are each independently, hydrogen or a group of

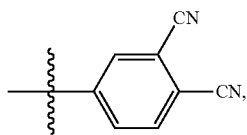

and at least one of $Z^1$ to $Z^5$ in each Chemical Formula is a group of

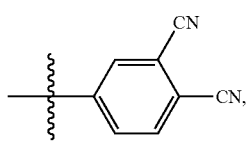 [SMILES: *c1ccc(C#N)c(C#N)c1]

p is 1 to 10, and
n and m are respectively, a degree of polymerization of each repeat unit.

According to the embodiment of the invention, the Chemical Formula A may be represented by the following Chemical Formulas A-1 to A-3.

[Chemical Formula A-1]

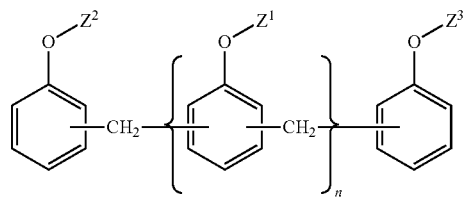

[Chemical Formula A-2]

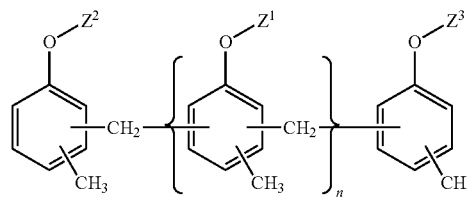

[Chemical Formula A-3]

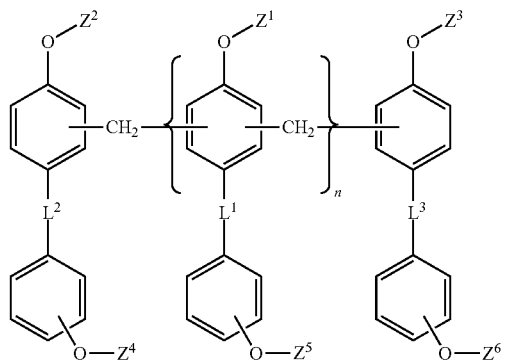

in the Chemical Formula A-1 to A-3,
$Z^1$ to $Z^6$ are each independently, hydrogen or a group of

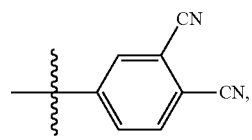 [SMILES: *c1ccc(C#N)c(C#N)c1]

and at least one of $Z^1$ to $Z^6$ included in each Chemical Formula is a group of

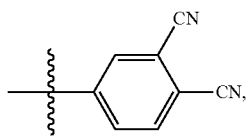 [SMILES: *c1ccc(C#N)c(C#N)c1]

$L^1$ to $L^3$ are each independently, a $C_{1-5}$ alkylene group substituted with a $C_{1-5}$ alkyl group, and n is a degree of polymerization of each repeat unit.

Specifically, the Chemical Formula A-3 may be represented by the following Chemical Formula (A-3)'.

[Chemical Formula (A-3)']

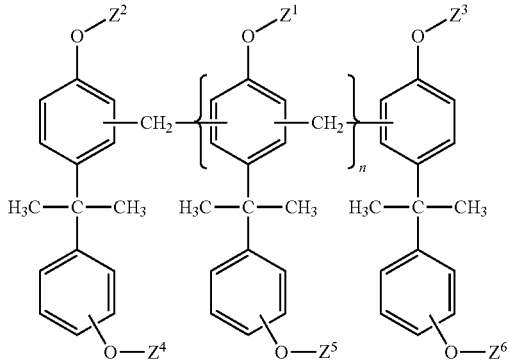

In the Chemical Formula (A-3)', $Z^1$ to $Z^6$ are as defined in the Chemical Formula A-3.

According to the embodiment of the invention, the Chemical Formula B may be represented by the following Chemical Formula B-1.

[Chemical Formula B-1]

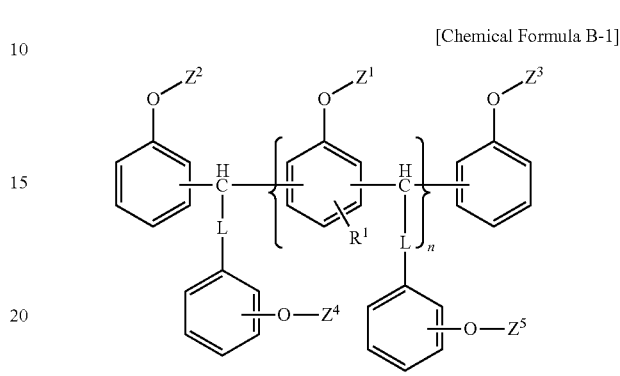

In the Chemical Formula B-1, $Z^1$ to $Z^5$ and n are as defined in the Chemical Formula B.

According to the embodiment of the invention, the Chemical Formula C may be represented by the following Chemical Formula C-1.

[Chemical Formula C-1]

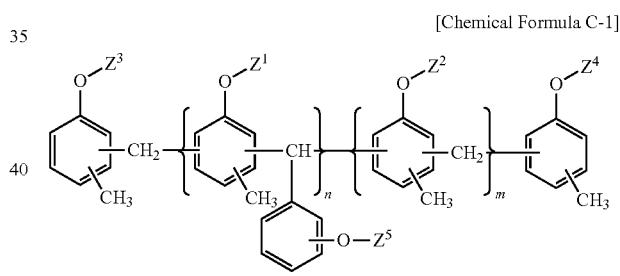

In the Chemical Formula C-1 $Z^1$ to $Z^5$, n, and m are as defined in the Chemical Formula C.

According to the embodiment of the invention, the Chemical Formula D may be represented by the following Chemical Formula D-1.

[Chemical Formula D-1]

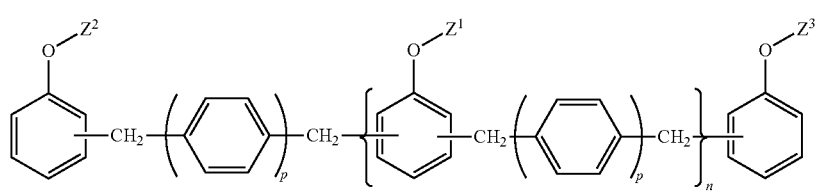

In the Chemical Formula D, $Z^1$ to $Z^3$, p and n are as defined in the Chemical Formula D.

Meanwhile, the (a) phthalonitrile oligomer may be prepared by reacting an oligomer comprising one or more repeat units represented by the following Chemical Formula 1'(hereinafter, referred to as an "oligomer of the Chemical Formula 1'") and a phthalonitrile compound (for example, 4-nitrophthalonitrile).

[Chemical Formula 1']

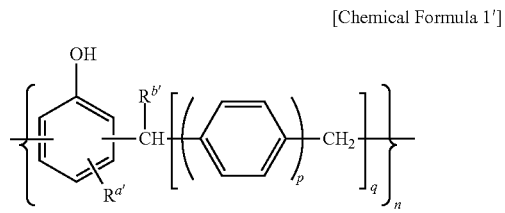

In the Chemical Formula 1', $R^{a'}$ and $R^{b'}$ are each independently, hydrogen, a $C_{1-5}$ alkyl group, a $C_{1-3}$ hydroxyalkyl group, or a group represented by

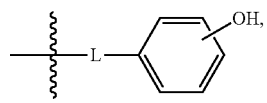

L is a direct bond or a $C_{1-5}$ alkylene group unsubstituted or substituted with a $C_{1-5}$ alkyl group, p is 1 to 10, q is 0 or 1, and n is a degree of polymerization of the repeat unit represented by the Chemical Formula 1.

By the reaction of the oligomer of the Chemical Formula 1' and the phthalonitrile compound, a phthalonitrile group bonds to the —OH group included in the oligomer of the Chemical Formula 1', thereby synthesizing the (a) phthalonitrile oligomer.

In the above reaction, the amount of

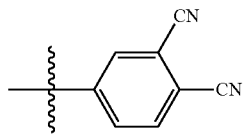 [SMILES: *c1ccc(C#N)c(C#N)c1]

groups (groups corresponding to $Z^a$ and $Z^b$) introduced in the repeat units of the Chemical Formula 1 may vary according to the reaction rate of the oligomer of the Chemical Formula 1' and the phthalonitrile compound.

As the oligomer of the Chemical Formula 1', those prepared by a common method in the technical field to which the present invention pertains may be used.

And, as the oligomer of the Chemical Formula 1', commercial products comprising one or more repeat units represented by the Chemical Formula 1' may be used.

Meanwhile, the (a) phthalonitrile oligomer may have a weight average molecular weight of 1,000 g/mol to 30,000 g/mol.

Throughout the specification, the term "weight average molecular weight" is a numerical value converted in terms of standard polystyrene, measured by GPC (gel permeation chromatograph). In the specification, the term "molecular weight" means weight average molecular weight unless otherwise described.

As non-limiting examples, molecular weight is measured using Agilent PL-GPC 220 equipped with PolarGel MIXED-L column of a length of 300 mm (Polymer Laboratories). The measurement temperature is 65° C., dimethylformamide is used as a solvent, and flow rate is 1 mL/min. A sample is prepared at the concentration of 10 mg/10 mL, and then, fed in an amount of 100 μL. With reference to a calibration curve formed using polystyrene standard, Mw and Mn values are derived. As the polystyrene standard, 8 kinds having molecular weights (g/mol) of 580/3,940/8,450/31,400/70,950/316,500/956,000/4,230,000 are used.

The (a) phthalonitrile oligomer may be given molecular weight in a wide range of 1,000 g/mol to 30,000 g/mol. Through the control of the molecular weight, rheological properties of the (a) phthalonitrile oligomer such as a softening point, melt viscosity, and the like may be controlled.

Meanwhile, the curable resin composition may further comprise a phthalonitrile compound well known in the art, in addition to the (a) phthalonitrile oligomer.

As non-limiting examples, as the phthalonitrile compound, compounds described in U.S. Pat. Nos. 4,408,035, 5,003,039, 5,003,078, 5,004,801, 5,132,396, 5,139,054, 5,208,318, 5,237,045, 5,292,854, or U.S. Pat. No. 5,350,828, and the like may be mentioned.

Preferably, the curable resin composition may further comprise a (a') phthalonitrile compound represented by the following Chemical Formula P1.

[Chemical Formula P1]

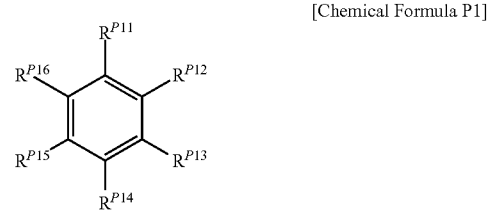

In the Chemical Formula P1, $R^{P11}$ to $R^{P16}$ are each independently, hydrogen, a $C_{1-5}$ alkyl group, a $C_{1-5}$ alkoxy group, a $C_{6-30}$ aryl group, a group of the following Chemical Formula P2, or a group of the following Chemical Formula P3, and two or more of $R^{P11}$ to $R^{P16}$ are a group of the following Chemical Formula P2 or a group of the following Chemical Formula P3,

[Chemical Formula P2]

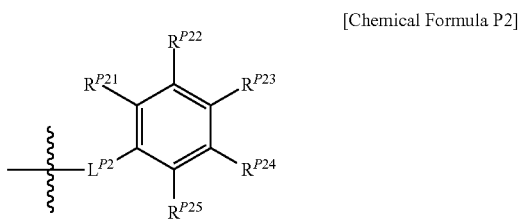

In the Chemical Formula P2, $L^{P2}$ is a direct bond, a $C_{1-5}$ alkylene group, —O—, —S—, —C(=O)—, —S(=O)—, or —S(=O)$_2$—, $R^{P21}$ to $R^{P25}$ are each independently, hydrogen, a $C_{1-5}$ alkyl group, a $C_{1-5}$ alkoxy group, a $C_{6-30}$ aryl group, or a cyano group, and two or more of $R^{P21}$ to $R^{P25}$ are cyano groups,

[Chemical Formula P3]

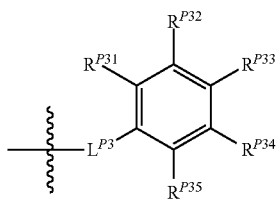

in the Chemical Formula P3,
$L^{P3}$ is a direct bond, a $C_{1-5}$ alkylene group, —O—, —S—, —C(=O)—, —S(=O)—, or —S(=O)$_2$—,
$R^{P31}$ to $R^{P35}$ are each independently, hydrogen, a $C_{1-5}$ alkyl group, a $C_{1-5}$ alkoxy group, a $C_{6-30}$ aryl group, or a group of the Chemical Formula P2, and one or more of $R^{P31}$ to $R^{P35}$ are the groups of the Chemical Formula P2.

As non-limiting examples, the (a') phthalonitrile compound may be a compound represented by the following Chemical Formula P1'.

[Chemical Formula P1']

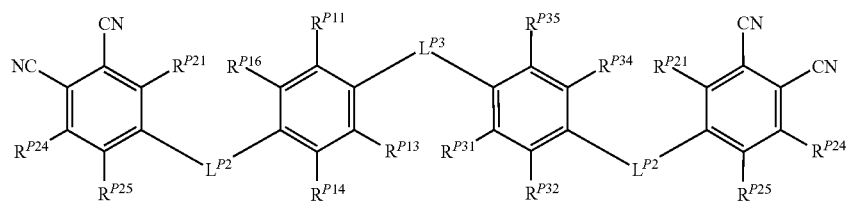

in the Chemical Formula P1',
$L^{P2}$ and $L^{P3}$ are each independently, a direct bond, a $C_{1-5}$ alkylene group, —O—, —S—, —C(=O)—, —S(=O)—, or —S(=O)$_2$—.
$R^{P11}$ to $R^{P16}$, $R^{P21}$ to $R^{P25}$, and $R^{P31}$ to $R^{P35}$ are each independently, hydrogen, a $C_{1-5}$ alkyl group, a $C_{1-5}$ alkoxy group, or a $C_{6-30}$ aryl group.

In case the curable resin composition comprises the (a) phthalonitrile oligomer and the (a') phthalonitrile compound represented by the Chemical Formula P1, it is preferable that the (a) phthalonitrile oligomer is included in the content of 20 wt % or more, based on the total weight of the phthalonitrile components.

Namely, in order to sufficiently obtain the effect resulting from the application of the (a) phthalonitrile oligomer, it is preferable that the (a) phthalonitrile oligomer is included in the content of 20 wt % or more, or 20 to 100 wt %, in the phthalonitrile components applied in the curable resin composition.

The content of the (a) phthalonitrile oligomer may be controlled in the range of 20 to 100 wt % in the phthalonitrile components, as necessary (for example, according to the melt viscosity range required).

(b) A Curing Agent

According to the embodiment of the invention, the curable resin composition comprises a curing agent.

The curing agent is a compound capable of reacting with the (a) phthalonitrile oligomer to form phthalonitrile resin.

For example, the curing agent may be a compound comprising a functional group capable of reacting with the cyano group of the (a) phthalonitrile oligomer.

Preferably, the curing agent may be a compound having one or more functional groups selected from the group consisting of an amine group, a hydroxy group and an imide group.

Specifically, the curing agent may be a compound represented by the following Chemical Formula 2.

[Chemical Formula 2]

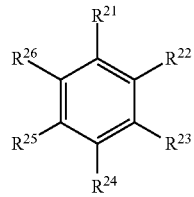

in the Chemical Formula 2, $R^{21}$ to $R^{26}$ are each independently, hydrogen, a $C_{1-5}$ alkyl group, a $C_{1-5}$ alkoxy group, a $C_{6-30}$ aryl group, an amine group, or a group of the following Chemical Formula 3, and two or more of $R^{21}$ to $R^{26}$ are an amine group or a group of the following Chemical Formula 3,

[Chemical Formula 3]

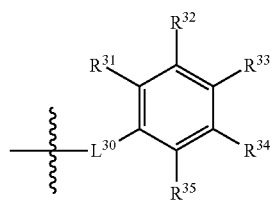

in the Chemical Formula 3,
$L^{30}$ is a direct bond, a $C_{1-5}$ alkylene group, —O— or —S—,
$R^{31}$ to $R^{35}$ are each independently, hydrogen, a $C_{1-5}$ alkyl group, a $C_{1-5}$ alkoxy group, a $C_{6-30}$ aryl group, or an amine group, and at least one of $R^{31}$ to $R^{35}$ is an amine group.

As non-limiting examples, the curing agent may be a compound represented by the following Chemical Formula 2'.

[Chemical Formula 2']

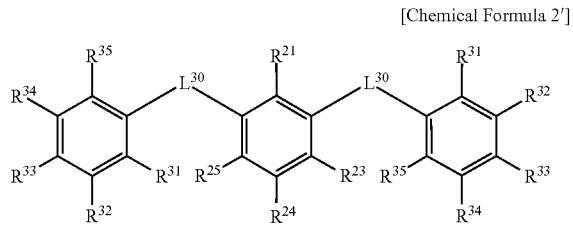

in the Chemical Formula 2'
$R^{21}$, $R^{23}$, $R^{24}$, and $R^{25}$ are each independently, hydrogen, a $C_{1-5}$ alkyl group, a $C_{1-5}$ alkoxy group, or a $C_{6-30}$ aryl group, $L^{30}$'s are each independently, a direct bond, a $C_{1-5}$ alkylene group, —O— or —S—, and $R^{31}$ to $R^{35}$ are each independently, hydrogen, a $C_{1-5}$ alkyl group, a $C_{1-5}$ alkoxy group, a $C_{6-30}$ aryl group, or an amine group, and at least one of $R^{31}$ to $R^{35}$ are amine groups.

And, the curing agent may be a compound represented by the following Chemical Formula 4.

[Chemical Formula 4]

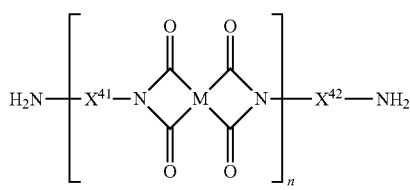

in the Chemical Formula 4,

M is a tetravalent radical derived from a compound represented by any one of the following Chemical Formulas 5 to 7, $X^{41}$ and $X^{42}$ are each independently, a divalent radical derived from a compound represented by any one of the following Chemical Formulas 8 and 9, and n is equal to or greater than 1;

[Chemical Formula 5]

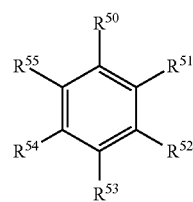

in the Chemical Formula 5, $R^{50}$ to $R^{55}$ are each independently, hydrogen, a $C_{1-5}$ alkyl group, a $C_{1-5}$ alkoxy group, or a $C_{6-30}$ aryl group;

[Chemical Formula 6]

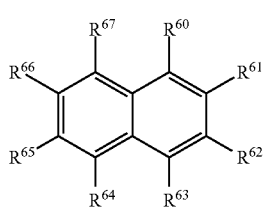

in the Chemical Formula 6, $R^{80}$ to $R^{67}$ are each independently, hydrogen, a $C_{1-5}$ alkyl group, a $C_{1-5}$ alkoxy group, or a $C_{6-30}$ aryl group;

[Chemical Formula 7]

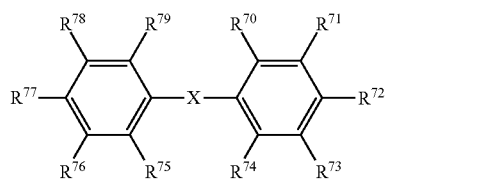

in the Chemical Formula 7, $R^{70}$ to $R^{79}$ are each independently, hydrogen, a $C_{1-5}$ alkyl group, a $C_{1-5}$ alkoxy group, or a $C_{6-30}$ aryl group, X is a direct bond, a $C_{1-5}$ alkylene group, —O—, —S—, —C(=O)—, —S(=O)—, —S(=O)$_2$—, —C(=O)—O-$L^1$-O—C(=O)—, -$L^2$-C(=O)—O-$L^3$-, -$L^4$-O—C(=O)-$L^5$-, or -$L^8$-$Ar^1$-$L^7$-$Ar^2$-$L^8$-, wherein $L^1$ to $L^8$ are each independently, a direct bond, —O—, or a $C_{1-5}$ alkylene group; and $Ar^1$ and $Ar^2$ are each independently, a $C_{6-30}$ arylene group;

[Chemical Formula 8]

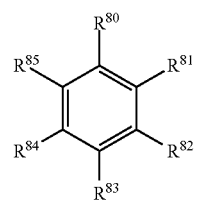

in the Chemical Formula 8, $R^{80}$ to $R^{85}$ are each independently, hydrogen, a $C_{1-5}$ alkyl group, a $C_{1-5}$ alkoxy group, a $C_{6-30}$ aryl group, a hydroxy group, a carboxyl group;

[Chemical Formula 9]

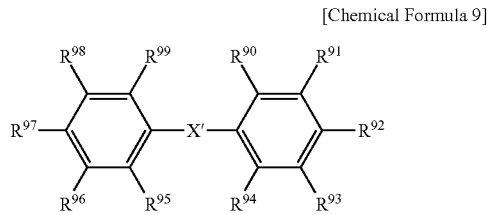

in the Chemical Formula 9, $R^{90}$ to $R^{99}$ are each independently, hydrogen, a $C_{1-5}$ alkyl group, a $C_{1-5}$ alkoxy group, a $C_{6-30}$ aryl group, a hydroxy group, or a carboxyl group, X' is a direct bond, a $C_{1-5}$ alkylene group, —O—, —S—, —C(=O)—, —NR$^a$—, —S(=O)—, —S(=O)$_2$—, -$L^9$-$Ar^3$-$L^{10}$-, or -$L^{11}$-$Ar^4$-$L^{12}$-$Ar^5$-$L^{13}$-; wherein R$^a$ is hydrogen, a $C_{1-5}$ alkyl group, a $C_{1-5}$ alkoxy group, or a $C_{6-30}$ aryl group; $L^9$ to $L^{13}$ are each independently, a direct bond, —O—, or a $C_{1-5}$ alkylene group; and $Ar^3$ to $Ar^5$ are each independently, a $C_{6-30}$ arylene group.

As non-limiting examples, the curing agent may be a compound represented by the following Chemical Formula 4' or Chemical Formula 4".

[Chemical Formula 4']

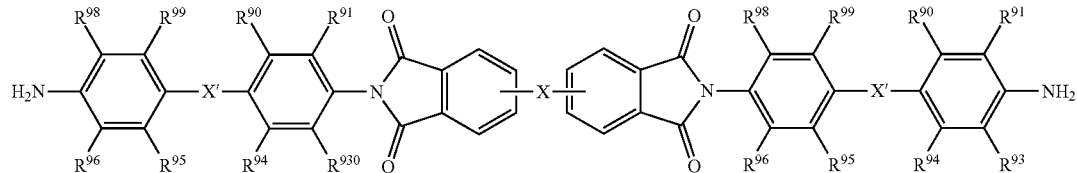

[Chemical Formula 4"]

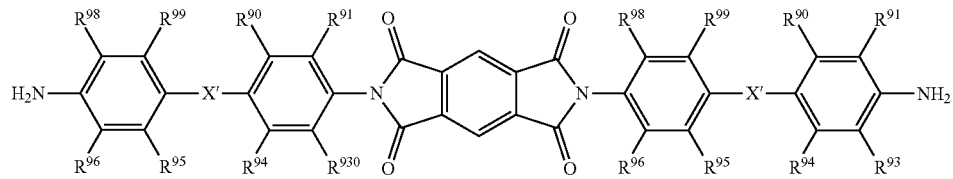

in the Chemical Formulas 4' and 4",

X and X' are each independently, a direct bond, a $C_{1-5}$ alkylene group, —O—, —S—, —C(=O)—, —S(=O)—, —S(=O)$_2$—, —C(=O)—O-L$^1$-O—C(=O)—, -L$^2$-C (=O)—O-L$^3$-, -L$^4$-O—C(=O)-L$^5$-, or -L$^8$-Ar$^1$-L$^7$-Ar$^2$-L$^8$-, wherein L$^1$ to L$^8$ are each independently, a direct bond, —O—, or a $C_{1-5}$ alkylene group; Ar$^1$ and Ar$^2$ are each independently, a $C_{6-30}$ arylene group, and R$^{90}$ to R$^{99}$ are each independently, hydrogen, a $C_{1-5}$ alkyl group, a $C_{1-5}$ alkoxy group, a $C_{6-30}$ aryl group, a hydroxyl group, or a carboxyl group.

Meanwhile, the content of the curing agent may be controlled in a range where curability to be given to the curable resin composition can be secured.

As non-limiting examples, the curing agent may be included at the mole ratio of 0.01 moles to 1.5 moles per one mole of the phthalonitrile oligomer.

As non-limiting examples, the curing agent may be included at the mole ratio of 0.01 moles to 1.5 moles pre one mole of the phthalonitrile components included in the curable resin composition. Wherein, the "phthalonitrile components" include the (a) phthalonitrile oligomer and (a') phthalonitrile compound included in the curable resin composition.

If the mole ratio of the curing agent increases, process window may become narrow, and thus, processability may be lowered, or high temperature curing condition may be required. And, if the mole ratio of the curing agent decreases, curability may become insufficient.

(c) Additives

According to the embodiment of the invention, the curable resin composition may further comprise additives according to the application field and use.

The kind of the additives is not specifically limited.

And, the content of the additives may be controlled in a range where the properties of the curable resin composition are not hindered.

As non-limiting examples, as the additives, reinforcing fiber such as metal fiber, glass fiber, aramid fiber, potassium titanate fiber, celluloid fiber, sepiolite fiber, ceramic fiber, and acrylic fiber; inorganic filler such as barium sulfate, calcium carbonate, zirconia, alumina, zirconium silicate, and silicon carbide; lubricant such as graphite, polytetrafluoroethylene, tungsten disulfide, molybdenum disulfide, and milled carbon fiber, and the like may be used.

II. A Prepolymer

According to another embodiment of the invention, a prepolymer, which is the reaction product of the above explained curable resin composition, is provided.

The prepolymer means a state wherein the reaction of the phthalonitrile oligomer and curing agent occur to some degree in the curable resin composition (for example, a state wherein polymerization of A or B stage occurs), but completely cured state is not reached and appropriate flowability is exhibited so as to be processed.

The prepolymer may exhibit low softening point and wide process window, like the curable resin composition.

Particularly, the prepolymer may have melt viscosity that can be controlled in a wide range, and thus, simultaneously have excellent wettability to filler and processability.

According to the embodiment of the invention, the prepolymer may exhibit melt viscosity of 0.01 Pas to 1,000,000 Pas under temperature of 100 to 240° C. according to the standard test method of ASTM D3835-08.

Advantageous Effects

According to the present invention, a curable resin composition that has melt viscosity controllable in a wide range and thus can be applied for more various fields, and a prepolymer thereof are provided.

EXAMPLES

Hereinafter, preferable examples are presented for better understanding of the invention. However, these examples are presented only as the illustrations of the invention, and the present invention is not limited thereby.

$^1$H-NMR (Nuclear Magnetic Resonance) Analysis

For the compounds prepared below, NMR analysis was conducted using a 500 MHz NMR spectrometer of Agilent Inc., according to the manual of the manufacturing company. The samples for NMR analysis were prepared by dissolving compounds in DMSO (dimethyl sulfoxide)-d6.

Measurement of Weight Average Molecular Weight

Using an Agilent PL-GPC 220 equipped with 300 mm PolarGel MIXED-L column (Polymer Laboratories), the weight average molecular weights ($M_w$) of the phthalonitrile oligomers obtained in the following Preparation Examples were measured. The results were shown in each Preparation Example.

The measurement temperature was 65° C., dimethylformamide was used as a solvent, and flow rate was 1 mL/min. A sample was prepared at the concentration of 10 mg/10 mL, and then, fed in an amount of 100 μL. With reference to a calibration curve formed using polystyrene standard, Mw and Mn values are derived. As the polystyrene standard, 8 kinds having molecular weights (g/mol) of 580/3,940/8,450/ 31,400/70,950/316,500/956,000/4,230,000 were used.

Preparation Example 1. Synthesis of Phthalonitrile Oligomer (PN-1)

A phthalonitrile oligomer represented by the following Chemical Formula PN-1 was synthesized as follows.

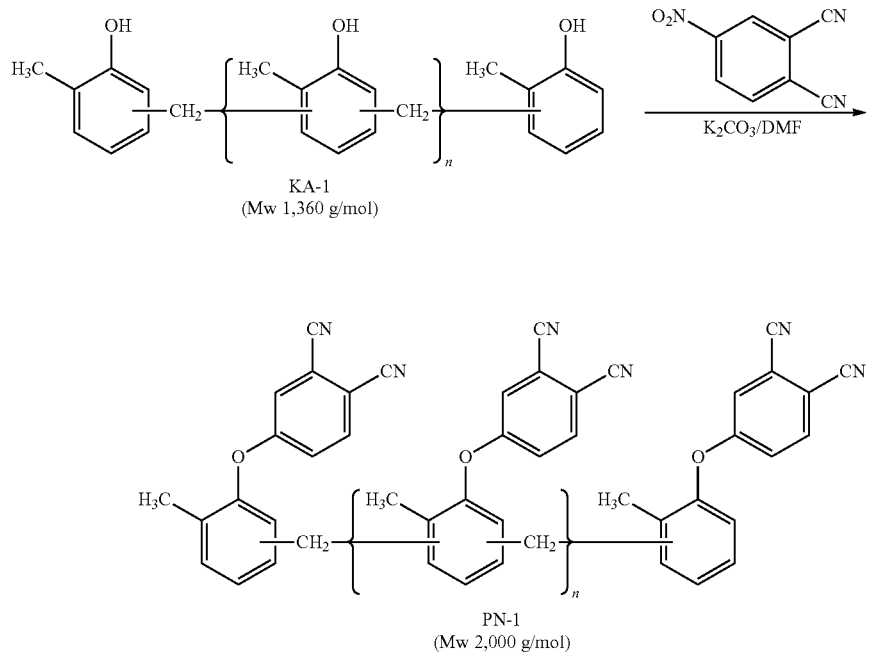

41.1 g of the oligomer represented by the Chemical Formula KA-1 (weight average molecular weight 1,360 g/mol) and 165.0 g of DMF (dimethyl formamide) were introduced into a 3 neck round bottom flask, and the mixture was stirred at room temperature to dissolve. 51.9 g of 4-nitro phthalonitrile was added thereto, 70.0 g of DMF was added, and then, the mixture was stirred to dissolve. Subsequently, 49.8 g of potassium carbonate and 30.0 g of DMF were introduced together, and the temperature was raised to 85° C. while stirring. After progressing a reaction for about 5 hours, the reaction solution was cooled to room temperature. The cooled reaction solution was poured into 0.2 N hydrochloric acid aqueous solution to neutralize and precipitate. After filtering, it was washed with water. The filtered solution was dried in a vacuum oven of 100° C. for a day. After removing water and residual solvents, a phthalonitrile oligomer represented by the Chemical Formula PN-1 (weight average molecular weight 2,000 g/mol) was obtained with the yield of 95 wt %.

The $^1$H-NMR analysis result of the phthalonitrile oligomer PN-1 was shown in FIG. 1.

Preparation Example 2. Synthesis of Phthalonitrile Olidomer (PN-2)

A phthalonitrile oligomer represented by the following Chemical Formula PN-2 was synthesized as follows.

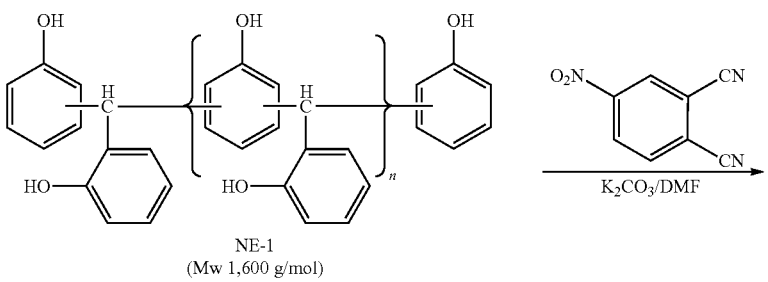

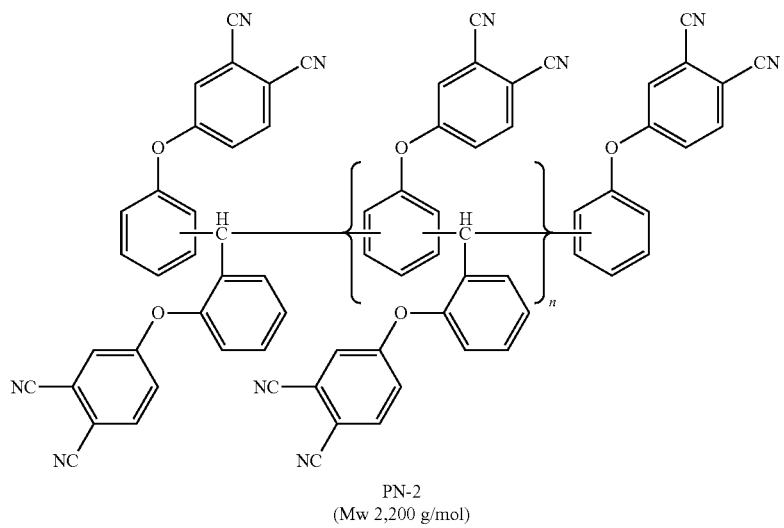

PN-2
(Mw 2,200 g/mol)

48.0 g of the oligomer represented by the Chemical Formula NE-1 (weight average molecular weight 1,600 g/mol) and 165.0 g of DMF (dimethyl formamide) were introduced into a 3 neck round bottom flask, and the mixture was stirred at room temperature to dissolve. 48.5 g of 4-nitro phthalonitrile was added thereto, 70.0 g of DMF was added, and then, the mixture was stirred to dissolve. Subsequently, 46.4 g of potassium carbonate and 30.0 g of DMF were introduced together, and the temperature was raised to 85° C. while stirring. After progressing a reaction for about 5 hours, the reaction solution was cooled to room temperature. The cooled reaction solution was poured into 0.2 N hydrochloric acid aqueous solution to neutralize and precipitate. After filtering, it was washed with water. The filtered solution was dried in a vacuum oven of 100° C. for a day. After removing water and residual solvents, a phthalonitrile oligomer represented by the Chemical Formula PN-2 (weight average molecular weight 2,200 g/mol) was obtained with the yield of 95 wt %.

The $^1$H-NMR analysis result of the phthalonitrile oligomer PN-2 was shown in FIG. 2.

Preparation Example 3. Synthesis of Phthalonitrile Olidomer (PN-3)

An oligomer (PN-3) represented by the Chemical Formula PN-2 and having weight average molecular weight of 2,400 g/mol was obtained with the yield of 95 wt % by the same method as Preparation Example 2, except that an oligomer represented by the Chemical Formula NE-1 and having weight average molecular weight of 1,700 g/mol was used instead of the oligomer represented by the Chemical Formula NE-1 (weight average molecular weight 1,600 g/mol).

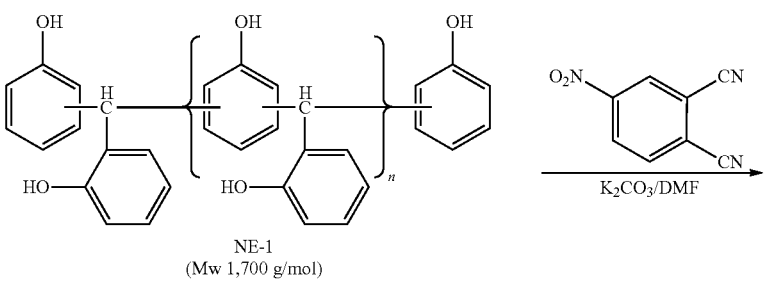

NE-1
(Mw 1,700 g/mol)

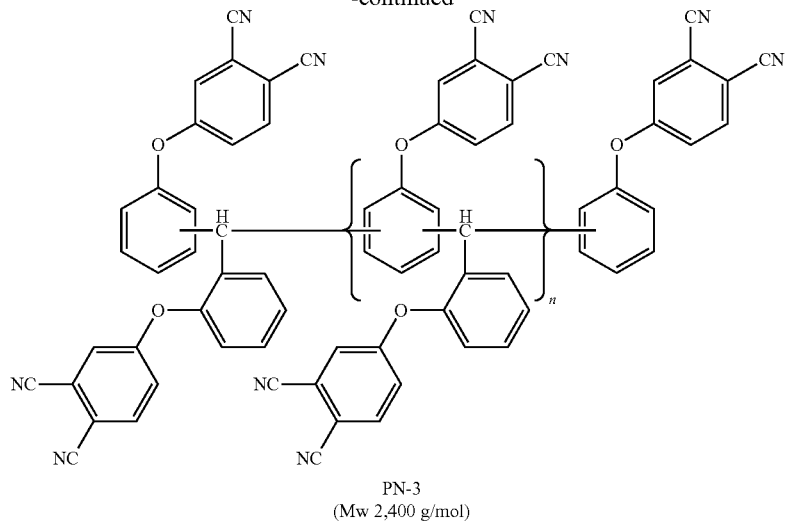

PN-3
(Mw 2,400 g/mol)

The ¹H-NMR analysis result of the phthalonitrile oligomer PN-3 was shown in FIG. 3.

Preparation Example 4. Synthesis of Phthalonitrile Oligomer (PN-4)

A phthalonitrile oligomer represented by the following Chemical Formula PN-4 was synthesized as follows.

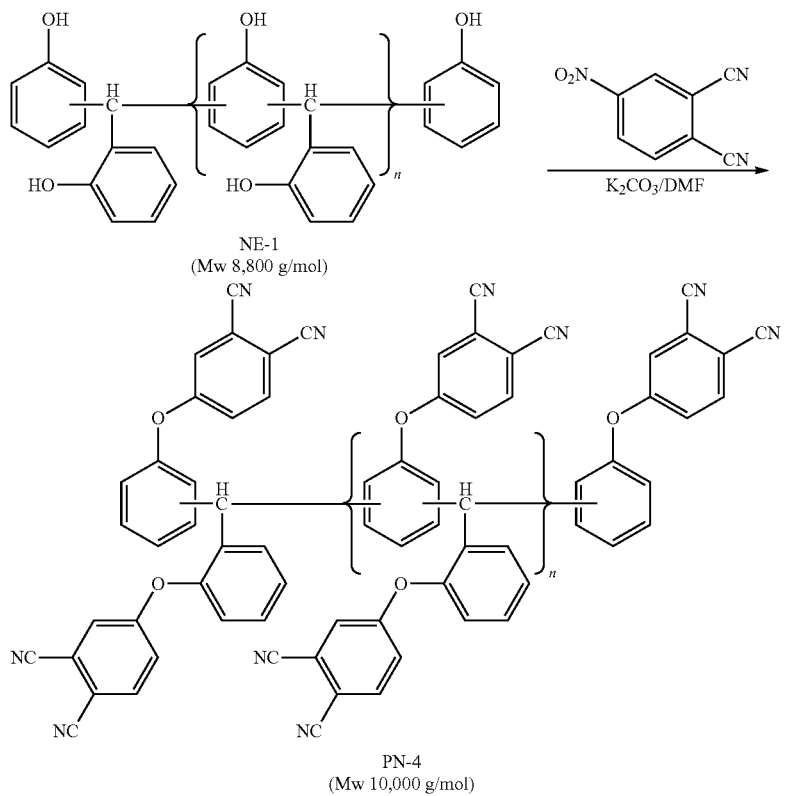

PN-4
(Mw 10,000 g/mol)

48.6 g of the oligomer represented by the Chemical Formula NE-1 and having weight average molecular weight 8,800 g/mol, and 155.0 g of DMF (dimethyl formamide) were introduced into a 3 neck round bottom flask, and the mixture was stirred at room temperature to dissolve. 45.2 g of 4-nitrophthalonitrile was added thereto, 70.0 g of DMF was added, and then, the mixture was stirred to dissolve. Subsequently, 43.2 g of potassium carbonate and 30.0 g of DMF were introduced together, and the temperature was raised to 85° C. while stirring. After progressing a reaction for about 5 hours, the reaction solution was cooled to room temperature. The cooled reaction solution was poured into 0.2 N hydrochloric acid aqueous solution to neutralize and precipitate. After filtering, it was washed with water. The filtered solution was dried in a vacuum oven of 100° C. for a day. After removing water and residual solvents, a phthalonitrile oligomer represented by the Chemical Formula PN-4 (weight average molecular weight 10,000 g/mol) was obtained with the yield of 90 wt %.

The $^1$H-NMR analysis result of the phthalonitrile oligomer PN-4 was shown in FIG. 4.

Preparation Example 5. Synthesis of Phthalonitrile Olidomer (PN-5)

A phthalonitrile oligomer represented by the following Chemical Formula PN-5 was synthesized as follows.

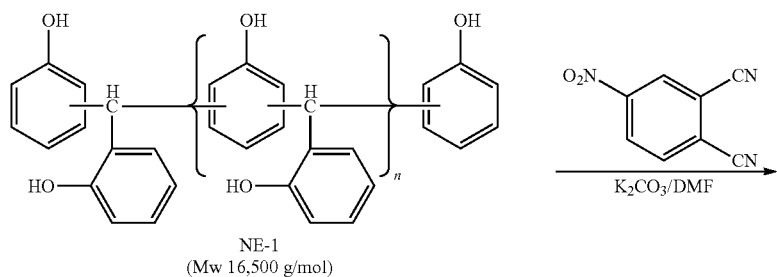

NE-1
(Mw 16,500 g/mol)

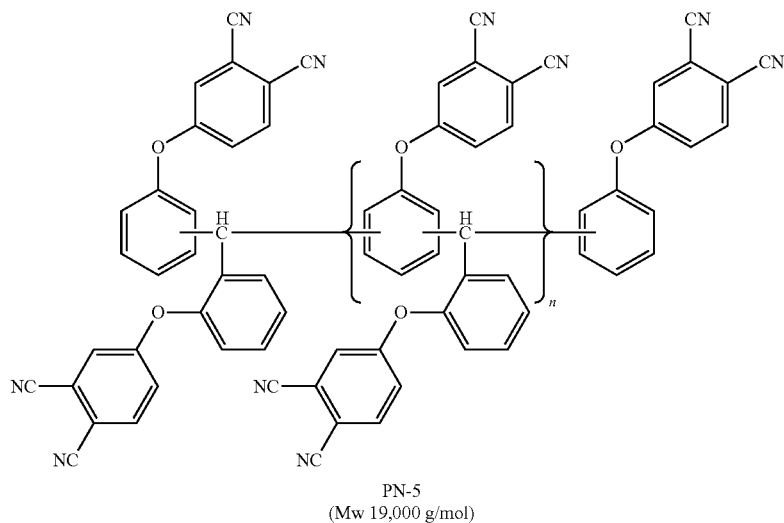

PN-5
(Mw 19,000 g/mol)

48.0 g of an oligomer represented by the Chemical Formula NE-1 and having weight average molecular weight 16,500 g/mol, and 170.0 g of DMF (dimethyl formamide) were introduced into a 3 neck round bottom flask, and the mixture was stirred at room temperature to dissolve. 49.7 g of 4-nitrophthalonitrile was added thereto, 70.0 g of DMF was added, and then, the mixture was stirred to dissolve. Subsequently, 47.6 g of potassium carbonate and 30.0 g of DMF were introduced together, and the temperature was raised to 85° C. while stirring. After progressing a reaction for about 5 hours, the reaction solution was cooled to room temperature. The cooled reaction solution was poured into 0.2 N hydrochloric acid aqueous solution to neutralize and precipitate. After filtering, it was washed with water. The filtered solution was dried in a vacuum oven of 100° C. for a day. After removing water and residual solvents, a phthalonitrile oligomer represented by the Chemical Formula PN-5 (weight average molecular weight 19,000 g/mol) was obtained with the yield of 95 wt %.

Preparation Example 6. Synthesis of Phthalonitrile Olidomer (PN-6)

A phthalonitrile oligomer represented by the following Chemical Formula PN-6 was synthesized as follows.

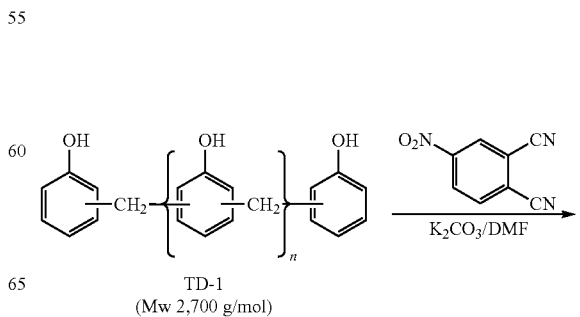

TD-1
(Mw 2,700 g/mol)

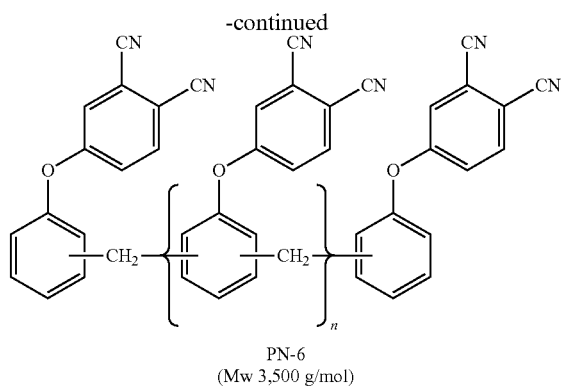

PN-6
(Mw 3,500 g/mol)

33.9 g of an oligomer represented by the Chemical Formula TD-1 (weight average molecular weight 2,700 g/mol, and 164.0 g of DMF (dimethyl formamide) were introduced into a 3 neck round bottom flask, and the mixture was stirred at room temperature to dissolve. 55.4 g of 4-nitrophthalonitrile was added thereto, 70.0 g of DMF was added, and then, the mixture was stirred to dissolve. Subsequently, 53.1 g of potassium carbonate and 30.0 g of DMF were introduced together, and the temperature was raised to 85° C. while stirring. After progressing a reaction for about 5 hours, the reaction solution was cooled to room temperature. The cooled reaction solution was poured into 0.2 N hydrochloric acid aqueous solution to neutralize and precipitate. After filtering, it was washed with water. The filtered solution was dried in a vacuum oven of 100° C. for a day. After removing water and residual solvents, a phthalonitrile oligomer represented by the Chemical Formula PN-6 (weight average molecular weight 3,500 g/mol) was obtained with the yield of 97 wt %.

The $^1$H-NMR analysis result of the phthalonitrile oligomer PN-6 was shown in FIG. 5.

Preparation Example 7. Synthesis of a
Phthalonitrile Compound (PN-7)

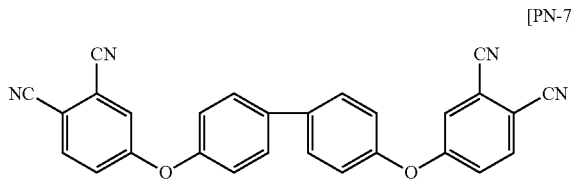 [SMILES: N#Cc1ccc(Oc2ccc(-c3ccc(Oc4ccc(C#N)c(C#N)c4)cc3)cc2)cc1C#N]

[PN-7]

23.3 g of 4,4'-dihydroxybiphneyl and 140 g of DMF (dimethyl formamide) were introduced into a 3 neck round bottom flask, and the mixture was stirred at room temperature to dissolve. 43.3 g of 4-nitrophthalonitrile was added thereto, 70.0 g of DMF was added, and then, the mixture was stirred to dissolve. Subsequently, 36.3 g of potassium carbonate and 30.0 g of DMF were introduced together, and the temperature was raised to 85° C. while stirring. After progressing a reaction for about 5 hours, the reaction solution was cooled to room temperature. The cooled reaction solution was poured into 0.2 N hydrochloric acid aqueous solution to neutralize and precipitate. After filtering, it was washed with water. The filtered solution was dried in a vacuum oven of 100° C. for a day. After removing water and residual solvents, a compound represented by the Chemical Formula PN-7 (4,4'-bis(3,4-dicyanophenoxy)biphenyl) was obtained with the yield of 90 wt %.

The $^1$H-NMR analysis result of the PN-7 compound was shown in FIG. 6.

Preparation Example 8. Synthesis of a
Phthalonitrile Compound (PN-8)

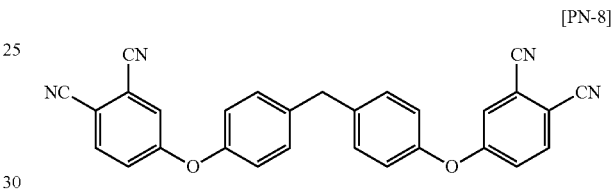

[PN-8]

28.0 g of bis(4-hydroxyphenyl)methane and 140 g of DMF (dimethyl formamide) were introduced into a 3 neck round bottom flask, and the mixture was stirred at room temperature to dissolve. 48.5 g of 4-nitrophthalonitrile was added thereto, 50.0 g of DMF was added, and then, the mixture was stirred to dissolve. Subsequently, 46.4 g of potassium carbonate and 30.0 g of DMF were introduced together, and the temperature was raised to 85° C. while stirring. After progressing a reaction for about 5 hours, the reaction solution was cooled to room temperature. The cooled reaction solution was poured into 0.2 N hydrochloric acid aqueous solution to neutralize and precipitate. After filtering, it was washed with water. The filtered solution was dried in a vacuum oven of 100° C. for a day. After removing water and residual solvents, a compound represented by the Chemical Formula PN-8 (4,4'-((methylenebis(4,1-phenylene))bis(oxy))diphthalonitrile) was obtained with the yield of 95 wt %.

The $^1$H-NMR analysis result of the PN-8 compound was shown in FIG. 7.

Preparation Example 9. Synthesis of a Curing
Agent (CA-1)

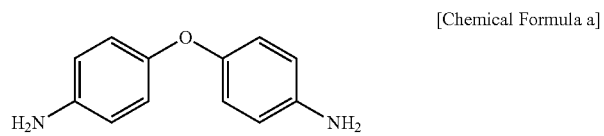

[Chemical Formula a]

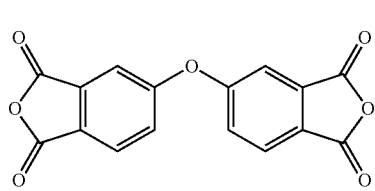

[Chemical Formula b]

-continued

[Chemical Formula c]

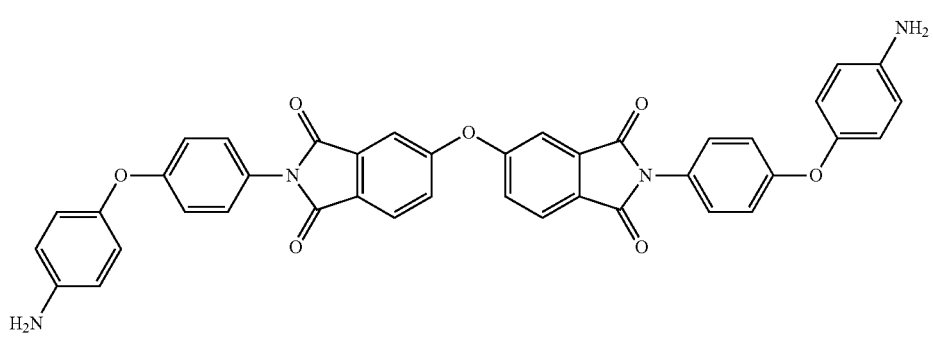

24 g of a compound of the Chemical Formula a and 45 g of NMP (N-methyl-pyrrolidone) were introduced into a 3 neck round bottom flask, and the mixture was stirred at room temperature to dissolve. It was cooled with a water bath, and 12.4 g of a compound of the Chemical Formula b was added portionwise three times together with 45 g of NMP. When the introduced compounds were completely dissolved, 18 g of toluene was added to the reaction solution so as to form an azeotrope. Dean-Stark equipment and a reflux condenser were installed, and toluene was introduced and filled into the Dean-Stark equipment. 4.2 mL of pyridine was introduced as a dehydration condensation catalyst, the temperature was raised to 170° C., and the mixture was stirred for 3 hours.

While removing water generated with the formation of an imide ring with Dean-Stark equipment, the mixture was additionally stirred for 2 hours, and residual toluene and pyridine were removed. The reaction product was cooled to a room temperature, and precipitated in methanol to recover. The recovered precipitate was extracted with methanol to remove residual reactants, and dried in a vacuum oven to obtain a CA-1 compound represented by the Chemical Formula c with the yield of 81 wt %.

The $^1$H-NMR analysis result of the CA-1 compound was shown in FIG. 8.

Preparation Example 10. Preparation of a Curing Agent (CA-2)

[CA-2]

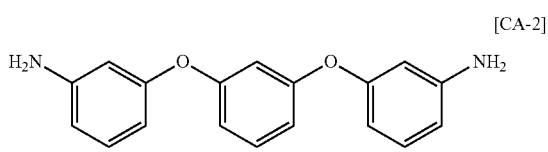 [SMILES: Nc1cccc(Oc2cccc(Oc3cccc(N)c3)c2)c1]

A compound represented by the Chemical Formula CA-2 (1,3-bis(3-aminophenoxy)benzene, m-APB, manufactured by TCI Co., Ltd.) was prepared as a curing agent without further purification process.

Example 1

The phthalonitrile oligomer PN-1 was completely molten on a hot plate of 240° C. using an aluminum dish. A curing agent of the compound of the Chemical Formula CA-1 was added thereto such that it existed in an amount of about 0.15 moles per 1 mole of the phthalonitrile oligomer PN-1. Additionally, the mixture was uniformly mixed on a hot plate of 240° C., and then cooled to prepare a prepolymer.

The melt viscosity of the prepared prepolymer was shown in the following Table 2.

The prepared prepolymer was heated at each temperature of 220° C., 250° C., 280° C., 310° C., and 340° C. for each 2 hours, for total 10 hours, to cure in an oven.

The state of the resin prepared through curing was shown in the following Table 2.

Example 2

A prepolymer and a cured resin were prepared by the same method as Example 1, except that a mixture of 75 wt % of the phthalonitrile oligomer PN-1 and 25 wt % of the phthalonitrile compound PN-8 was used instead of the phthalonitrile oligomer PN-1. Wherein, the curing agent of the compound of CA-1 was added such that it existed in an amount of about 0.15 moles per 1 mole of the mixture of PN-1 and PN-8.

Example 3

A prepolymer and a cured resin were prepared by the same method as Example 1, except that a mixture of 50 wt % of the phthalonitrile oligomer PN-1 and 50 wt % of the phthalonitrile compound PN-8 was used instead of the phthalonitrile oligomer PN-1.

Example 4

A prepolymer and a cured resin were prepared by the same method as Example 1, except that a mixture of 25 wt % of the phthalonitrile oligomer PN-1 and 75 wt % of the phthalonitrile compound PN-8 was used instead of the phthalonitrile oligomer PN-1.

Example 5

A prepolymer and a cured resin were prepared by the same method as Example 1, except that a phthalonitrile oligomer PN-2 was used instead of the phthalonitrile oligomer PN-1.

Example 6

A prepolymer and a cured resin were prepared by the same method as Example 1, except that a mixture of 50 wt % of the phthalonitrile oligomer PN-2 and 50 wt % of the phthalonitrile compound PN-8 was used instead of the phthalonitrile oligomer PN-1.

Example 7

A prepolymer and a cured resin were prepared by the same method as Example 1, except that a phthalonitrile oligomer PN-3 was used instead of the phthalonitrile oligomer PN-1.

Example 8

A prepolymer and a cured resin were prepared by the same method as Example 1, except that a mixture of 50 wt % of the phthalonitrile oligomer PN-3 and 50 wt % of the phthalonitrile compound PN-8 was used instead of the phthalonitrile oligomer PN-1.

Example 9

A prepolymer and a cured resin were prepared by the same method as Example 1, except that a phthalonitrile oligomer PN-4 was used instead of the phthalonitrile oligomer PN-1.

Example 10

A prepolymer and a cured resin were prepared by the same method as Example 1, except that a mixture of 50 wt % of the phthalonitrile oligomer PN-4 and 50 wt % of the phthalonitrile compound PN-8 was used instead of the phthalonitrile oligomer PN-1.

Example 11

A prepolymer and a cured resin were prepared by the same method as Example 1, except that a phthalonitrile oligomer PN-5 was used instead of the phthalonitrile oligomer PN-1.

Example 12

A prepolymer and a cured resin were prepared by the same method as Example 1, except that a mixture of 50 wt % of the phthalonitrile oligomer PN-5 and 50 wt % of the phthalonitrile compound PN-8 was used instead of the phthalonitrile oligomer PN-1.

Example 13

A prepolymer and a cured resin were prepared by the same method as Example 1, except that a phthalonitrile oligomer PN-6 was used instead of the phthalonitrile oligomer PN-1.

Example 14

A prepolymer and a cured resin were prepared by the same method as Example 1, except that a mixture of 50 wt % of the phthalonitrile oligomer PN-6 and 50 wt % of the phthalonitrile compound PN-8 was used instead of the phthalonitrile oligomer PN-1.

Example 15

A prepolymer and a cured resin were prepared by the same method as Example 1, except that the phthalonitrile oligomer PN-4 and the curing agent CA-2 were respectively used, instead of the phthalonitrile oligomer PN-1 and the curing agent CA-1.

Example 16

A prepolymer and a cured resin were prepared by the same method as Example 1, except that the phthalonitrile oligomer PN-5 and the curing agent CA-2 were respectively used, instead of the phthalonitrile oligomer PN-1 and the curing agent CA-1.

Comparative Example 1

A prepolymer and a cured resin were prepared by the same method as Example 1, except that the phthalonitrile compound PN-7 was used instead of the phthalonitrile oligomer PN-1.

Comparative Example 2

A prepolymer and a cured resin were prepared by the same method as Example 1, except that the phthalonitrile compound PN-8 was used instead of the phthalonitrile oligomer PN-1.

TABLE 1

| | Phthalonitrile components | | Curing agent |
|---|---|---|---|
| | (a) | (a') | (b) |
| Example 1 | PN-1 (100 wt %) | — | CA-1 |
| Example 2 | PN-1 (75 wt %) | PN-8 (25 wt %) | CA-1 |
| Example 3 | PN-1 (50 wt %) | PN-8 (50 wt %) | CA-1 |
| Example 4 | PN-1 (25 wt %) | PN-8 (75 wt %) | CA-1 |
| Example 5 | PN-2 (100 wt %) | — | CA-1 |
| Example 6 | PN-2 (50 wt %) | PN-8 (50 wt %) | CA-1 |
| Example 7 | PN-3 (100 wt %) | — | CA-1 |
| Example 8 | PN-3 (50 wt %) | PN-8 (50 wt %) | CA-1 |
| Example 9 | PN-4 (100 wt %) | — | CA-1 |
| Example 10 | PN-4 (50 wt %) | PN-8 (50 wt %) | CA-1 |
| Example 11 | PN-5 (100 wt %) | — | CA-1 |
| Example 12 | PN-5 (50 wt %) | PN-8 (50 wt %) | CA-1 |
| Example 13 | PN-6 (100 wt %) | — | CA-1 |
| Example 14 | PN-6 (50 wt %) | PN-8 (50 wt %) | CA-1 |
| Example 15 | PN-4 (100 wt %) | — | CA-2 |
| Example 16 | PN-5 (100 wt %) | — | CA-2 |
| Comparative Example 1 | — | PN-7 (100 wt %) | CA-1 |
| Comparative Example 2 | — | PN-8 (100 wt %) | CA-1 |

Experimental Example 1: Measurement of Melt Viscosity

The melt viscosities of prepolymers prepared in Examples and Comparative Examples were measured, and the results were shown in the following Table 2.

The melt viscosity was measured at 220° C. and frequency of 1 Hz for 900 seconds, after setting a gap to 1 mm with a parallel plate having a diameter of 25 mm, using Stress-Controlled Type Rheometer (DHR).

Experimental Example 2: Evaluation of Leakage 100 parts by weight of the prepolymers prepared in Examples and Comparative Examples and 20 parts by weight of graphite were mixed to prepare a composite material composition.

The composite material composition was injected in a mold of 240° C. and mold leakage property was evaluated according to the following standard. The results were shown in the following Table 2.

●: Leakage is not generated at atmospheric pressure and elevated pressure.

Δ: Leakage is not generated at atmospheric pressure, but leakage is generated at elevated pressure.

X: Leakage is generated at atmospheric pressure.

Experimental Example 3: Evaluation of Resin State after Curing

The cured resin obtained in Examples and Comparative Examples were observed with an unaided eye to evaluate the resin state after curing according to the following standard. The results were shown in the following Table 2.

●: Void is not observed at atmospheric pressure and elevated pressure.

Δ: Void is observed at atmospheric pressure, but is not observed at elevated pressure.

X: Void is observed at atmospheric pressure

TABLE 2

| | Melt viscosity (Pa · s) @ 220° C. | Melt viscosity (Pa · s) @ 130° C. | Leakage | Resin state after curing |
|---|---|---|---|---|
| Example 1 | 60 | 1,000 | ○ | ○ |
| Example 2 | 20 | NA | ○ | ○ |
| Example 3 | 1~5 | NA | ○ | ○ |
| Example 4 | 0.1~1 | NA | Δ | ○ |
| Example 5 | 100 | >1,000 | ○ | ○ |
| Example 6 | 40 | NA | ○ | ○ |
| Example 7 | 120 | >1,000 | ○ | Δ |
| Example 8 | 50 | NA | ○ | ○ |
| Example 9 | 500 | >100,000 | ○ | Δ |
| Example 10 | 50 | NA | ○ | ○ |
| Example 11 | 1,000 | >100,000 | ○ | Δ |
| Example 12 | 100 | NA | ○ | ○ |
| Example 13 | 300 | >10,000 | ○ | ○ |
| Example 14 | 100 | NA | ○ | ○ |
| Example 15 | 300 | NA | ○ | ○ |
| Example 16 | 700 | NA | ○ | ○ |
| Comparative Example 1 | <0.05 | 1~5 | X | ○ |
| Comparative Example 2 | <0.05 | 1~5 | X | Δ |

Referring Table 2, it was confirmed that the curable resin compositions according to Examples have melt viscosity controllable in a wide range, compared to Comparative Examples. And, it was confirmed that the curable resin compositions according to Examples were not leaked during molding processes at atmospheric pressure and at elevated pressure, and resin state after curing was excellent.

The invention claimed is:

1. A curable resin composition comprising (a) a phthalonitrile oligomer comprising one or more repeat unit represented by Chemical Formulas A-2 to D and (b) a curing agent:

[Chemical Formula A-2]

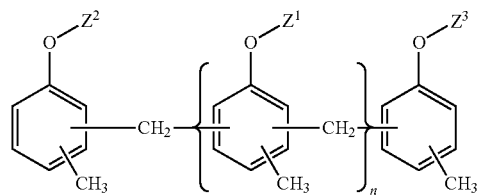

[Chemical Formula A-3]

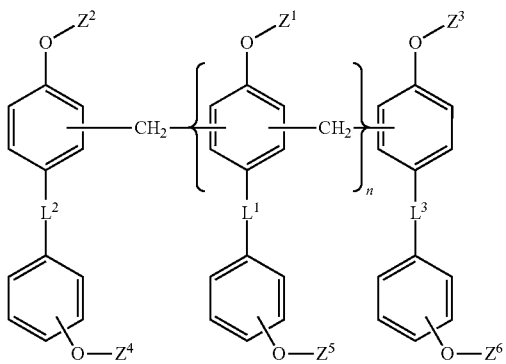

[Chemical Formula B]

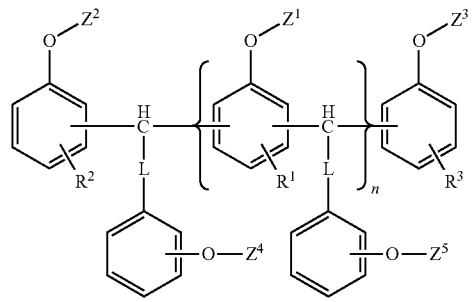

[Chemical Formula C]

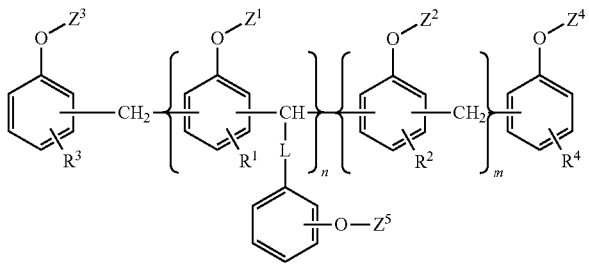

[Chemical Formula D]

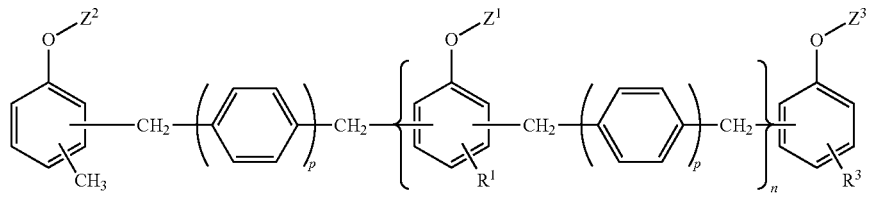

wherein in the Chemical Formulas A-2 to D, $R^1$ to $R^4$ are each independently, hydrogen, a $C_{1-5}$ alkyl group, a $C_{1-3}$ hydroxyalkyl group, or a group represented by

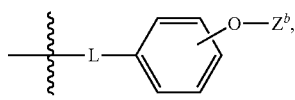

L is a direct bond or a $C_{1-5}$ alkylene group unsubstituted or substituted with a $C_{1-5}$ alkyl group, $Z^1$ to $Z^6$ are each independently, hydrogen or a group of

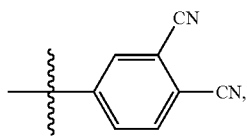 [SMILES: *c1ccc(C#N)c(C#N)c1]

and at least one of $Z^1$ to $Z^6$ in each of Chemical Formulas A-2-D is a group of

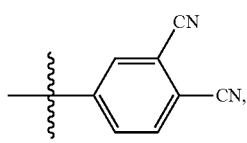 [SMILES: *c1ccc(C#N)c(C#N)c1]

$L^1$ to $L^3$ are each independently, a $C_{1-5}$ alkylene group substituted with a $C_{1-5}$ alkyl group, $Z^b$ is hydrogen or a group of

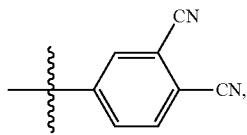

p is 1 to 10, and n and m are respectively, a degree of polymerization of each repeat unit.

2. The curable resin composition according to claim 1, wherein the one or more repeat unit comprises Chemical Formula B, and wherein the Chemical Formula B is represented by Chemical Formula B-1:

[Chemical Formula B-1]

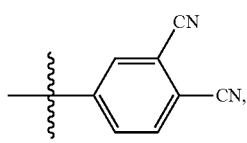 [SMILES: *c1ccc(C#N)c(C#N)c1]

wherein in the Chemical Formula B-1, $Z^1$ to $Z^5$ are each independently, hydrogen or a group of

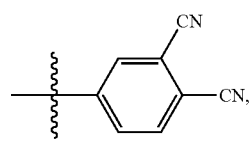

and at least
one of $Z^1$ to $Z^5$ included in the Chemical Formula B-1 is a group of

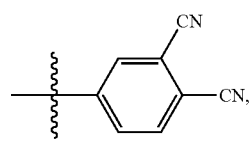

and n is a degree of polymerization of the repeat unit.

3. The curable resin composition according to claim 1, wherein the one or more repeat unit comprises Chemical Formula C, and wherein the Chemical Formula C is represented by Chemical Formula C-1:

[Chemical Formula C-1]

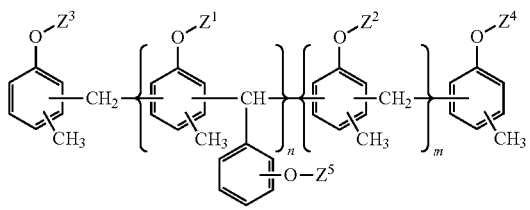

wherein in the Chemical Formula C-1,
Z¹ to Z⁵ are each independently, hydrogen or a group of

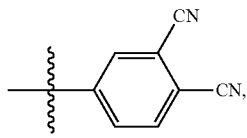 [SMILES: *c1ccc(C#N)c(C#N)c1]

and at least
one of Z¹ to Z⁵ included in the Chemical Formula C-1 is a group of

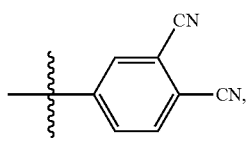 [SMILES: *c1ccc(C#N)c(C#N)c1]

and
n and m are respectively, a degree of polymerization of each repeat unit.

4. The curable resin composition according to claim 1, wherein the one or more repeat unit comprises Chemical Formula D, and wherein the Chemical Formula D is represented by Chemical Formula D-1:

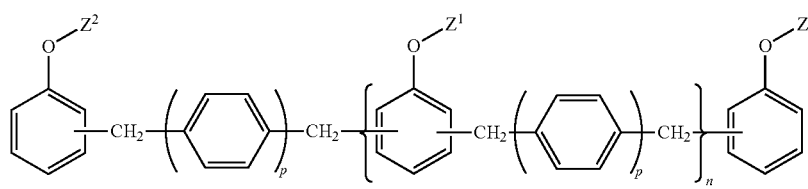

wherein in the Chemical Formula D-1,
Z¹ to Z³ are each independently, hydrogen or a group of

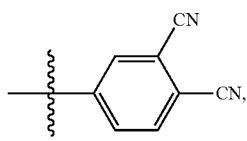 [SMILES: *c1ccc(C#N)c(C#N)c1]

and at least
one of Z¹ to Z³ included in the Chemical Formula D-1 is a group of

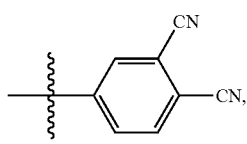 [SMILES: *c1ccc(C#N)c(C#N)c1]

p is 1 to 10, and
n is a degree of polymerization of the repeat unit.

5. The curable resin composition according to claim 1, wherein the phthalonitrile oligomer has a weight average molecular weight of 1,000 g/mol to 30,000 g/mol.

6. The curable resin composition according to claim 1, further comprising (a') a phthalonitrile compound represented by Chemical Formula P1:

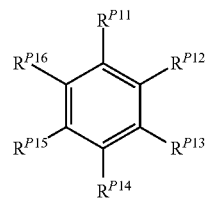

wherein in the Chemical Formula P1, $R^{P11}$ to $R^{P16}$ are each independently, hydrogen, a $C_{1-5}$ alkyl group, a $C_{1-5}$ alkoxy group, a $C_{6-30}$ aryl group, a group of the following Chemical Formula P2, or a group of the following Chemical Formula P3, and two or more of the $R^{P11}$ to $R^{P16}$ are a group of the following Chemical Formula P2 or a group of the following Chemical Formula P3,

[Chemical Formula P2]

wherein in the Chemical Formula P2,
$L^{P2}$ is a direct bond, a $C_{1-5}$ alkylene group, —O—, —S—, —C(=O)—, —S(=O)—, or —S(=O)$_2$—,
$R^{P21}$ to $R^{P25}$ are each independently, hydrogen, a $C_{1-5}$ alkyl group, a $C_{1-5}$ alkoxy group, a $C_{6-30}$ aryl group, or a cyano group, and two or more of the $R^{P21}$ to $R^{P25}$ are cyano groups,

[Chemical Formula P3]

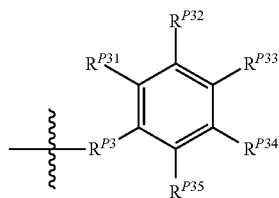

wherein in the Chemical Formula P3, $L^{P3}$ is a direct bond, a $C_{1-5}$ alkylene group, —O—, —S—, —C(=O)—, —S(=O)—, or —S(=O)$_2$—, $R^{P31}$ to $R^{P35}$ are each independently, hydrogen, a $C_{1-5}$ alkyl group, a $C_{1-5}$ alkoxy group, a $C_{6-30}$ aryl group, or a group of the Chemical Formula P2, and one or more of $R^{P31}$ to $R^{P35}$ are the groups of the Chemical Formula P2.

7. The curable resin composition according to claim 1, wherein the curing agent has one or more functional groups selected from the group consisting of an amine group, a hydroxy group and an imide group.

8. The curable resin composition according to claim 7, wherein the curing agent is a compound represented by Chemical Formula 2:

[Chemical Formula 2]

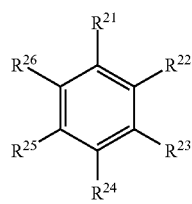

wherein in the Chemical Formula 2, $R^{21}$ to $R^{26}$ are each independently, hydrogen, a $C_{1-5}$ alkyl group, a $C_{1-5}$ alkoxy group, a $C_{6-30}$ aryl group, an amine group, or a group of the following Chemical Formula 3, and two or more of $R^{21}$ to $R^{26}$ are an amine group or a group of the following Chemical Formula 3,

[Chemical Formula 3]

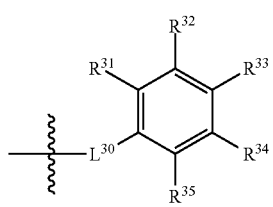

wherein in the Chemical Formula 3, $L^{30}$ is a direct bond, a $C_{1-5}$ alkylene group, —O— or —S—, and $R^{31}$ to $R^{35}$ are each independently, hydrogen, a $C_{1-5}$ alkyl group, a $C_{1-5}$ alkoxy group, a $C_{6-30}$ aryl group, or an amine group, and at least one of $R^{31}$ to $R^{35}$ is an amine group.

9. The curable resin composition according to claim 7, wherein the curing agent is a compound represented by Chemical Formula 4:

[Chemical Formula 4]

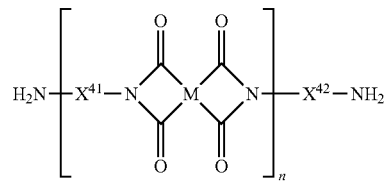

wherein in the Chemical Formula 4,

M is a tetravalent radical derived from a compound represented by any one of Chemical Formulas 5 to 7, $X^{41}$ and $X^{42}$ are each independently, a divalent radical derived from a compound represented by any one of Chemical Formulas 8 and 9, and n is equal to or greater than 1;

[Chemical Formula 5]

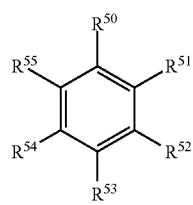

wherein in the Chemical Formula 5, $R^{50}$ to $R^{55}$ are each independently, hydrogen, a $C_{1-5}$ alkyl group, a $C_{1-5}$ alkoxy group, or a $C_{6-30}$ aryl group;

[Chemical Formula 6]

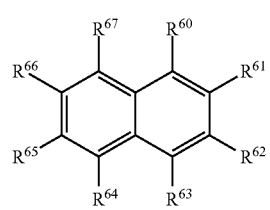

wherein in the Chemical Formula 6, $R^{60}$ to $R^{67}$ are each independently, hydrogen, a $C_{1-5}$ alkyl group, a $C_{1-5}$ alkoxy group, or a $C_{6-30}$ aryl group;

[Chemical Formula 7]

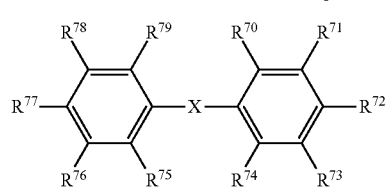

wherein n the Chemical Formula 7,

R$^{70}$ to R$^{79}$ are each independently, hydrogen, a C$_{1-5}$ alkyl group, a C$_{1-5}$ alkoxy group, or a C$_{6-30}$ aryl group, X is a direct bond, a C$_{1-5}$ alkylene group, —O—, —S—, —C(=O)—, —S(=O)—, —S(=O)$_2$—, —C(=O)—O—L$^1$-O—C(=O)—, -L$^2$-C(=O)—O-L$^3$-, -L$^4$-O—C(=O)-L$^5$-, or -L$^6$-Ar$^1$-L$^7$-Ar$^2$-L$^8$-; wherein L$^1$ to L$^8$ are each independently, a direct bond, —O—, or a C$_{1-5}$ alkylene group; and Ar$^1$ and Ar$^2$ are each independently, a C$_{6-30}$ arylene group;

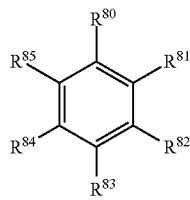

[Chemical Formula 8]

wherein in the Chemical Formula 8, R$^{80}$ to R$^{85}$ are each independently, hydrogen, a C$_{1-5}$ alkyl group, a C$_{1-5}$ alkoxy group, a C$_{6-30}$ aryl group, a hydroxy group, a carboxyl group;

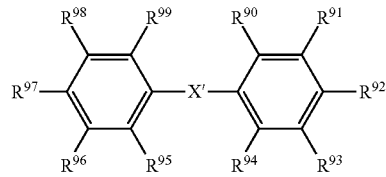

[Chemical Formula 9]

wherein in the Chemical Formula 9,

R$^{90}$ to R$^{99}$ are each independently, hydrogen, a C$_{1-5}$ alkyl group, a C$_{1-5}$ alkoxy group, a C$_{6-30}$ aryl group, a hydroxy group, or a carboxyl group, X' is a direct bond, a C$_{1-5}$ alkylene group, —O—, —S—, —C(=O)—, —NR$^a$—, —S(=O)—, —S(=O)$_2$—, -L$^9$-Ar$^3$-L$^{10}$-, or -L$^{11}$-Ar$^4$-L$^{12}$-Ar$^5$-L$^{13}$-; wherein R$^a$ is hydrogen, a C$_{1-5}$ alkyl group, a C$_{1-5}$ alkoxy group, or a C$_{6-30}$ aryl group; L$^9$ to L$^{13}$ are each independently, a direct bond, —O—, or a C$_{1-5}$ alkylene group; and Ar$^a$ to Ar$^y$ are each independently, a C$_{6-30}$ arylene group.

10. The curable resin composition according to claim 1, wherein the (b) curing agent is included at a mole ratio of 0.01 moles to 1.5 moles per one mole of the (a) phthalonitrile oligomer.

11. A prepolymer, comprising a reaction product of the curable resin composition according to claim 1.

12. The prepolymer according to claim 11, wherein the prepolymer has a melt viscosity of 0.01 Pa·s to 1,000,000 Pa·s under a temperature of 100 to 240° C. according to a standard test method of ASTM D3835-08.

* * * * *